(12) United States Patent
Endo et al.

(10) Patent No.: US 8,534,560 B2
(45) Date of Patent: Sep. 17, 2013

(54) TWO-DIMENSIONAL CODE READER AND PROGRAM

(75) Inventors: Hiroyuki Endo, Tokyo (JP); Masaki Takahashi, Kariya (JP)

(73) Assignee: Shift Co. Ltd., Tokyo (JP)

( * ) Notice: Subject to any disclaimer, the term of this patent is extended or adjusted under 35 U.S.C. 154(b) by 0 days.

(21) Appl. No.: 13/813,054

(22) PCT Filed: Aug. 31, 2010

(86) PCT No.: PCT/JP2010/005360
§ 371 (c)(1),
(2), (4) Date: Mar. 25, 2013

(87) PCT Pub. No.: WO2012/014264
PCT Pub. Date: Feb. 2, 2013

(65) Prior Publication Data
US 2013/0186957 A1    Jul. 25, 2013

(30) Foreign Application Priority Data
Jul. 30, 2010    (JP) .................................. 2010-172619

(51) Int. Cl.
*G06K 7/12*    (2006.01)

(52) U.S. Cl.
USPC ................... 235/469; 235/462.1; 235/462.04; 235/487

(58) Field of Classification Search
USPC ................. 235/469, 487, 494, 462.1, 462.11, 235/462.04
See application file for complete search history.

(56) References Cited

U.S. PATENT DOCUMENTS

| | | |
|---|---|---|
| 2001/0042788 A1 | 11/2001 | Ihara et al. |
| 2005/0001033 A1 | 1/2005 | Cheong et al. |
| 2006/0097062 A1 | 5/2006 | Cheong et al. |
| 2008/0298688 A1 | 12/2008 | Cheong et al. |
| 2009/0194596 A1 | 8/2009 | Kimura et al. |

FOREIGN PATENT DOCUMENTS

| | | |
|---|---|---|
| EP | 1 870 858 A2 | 12/2007 |
| EP | 2 043 026 A1 | 4/2009 |
| JP | 2000-148797 A | 5/2000 |
| JP | 2001-195536 A | 7/2001 |
| JP | 2003-248792 A | 9/2003 |
| JP | 2005-509223 A | 4/2005 |
| JP | 2006-134337 A | 5/2006 |

(Continued)

OTHER PUBLICATIONS

International Search Report for PCT/JP2010/005360, mailing date of Nov. 2, 2010.

*Primary Examiner* — Karl D Frech
(74) *Attorney, Agent, or Firm* — Westerman, Hattori, Daniels & Adrian, LLP

(57) ABSTRACT

Disclosed is a technology that specifies each of a plurality of two-dimensional codes in an image and reduces the processing time for judging color in each cell region in each specified two-dimensional code. Based on edge images generated from obtained images, candidate regions among these edge images are extracted, a judgment is made about whether or not a characteristic pattern is included in each of the corresponding regions in the original images that correspond to these extracted candidate regions, and then the two-dimensional code regions are detected from among the original images. The color is judged both for each pixel group that comprises each row of that region and for each pixel cell, in pixel array order. If it is determined that a certain number or more pixels in each row that corresponds to each cell region are included in the color judgment region, color judgment is omitted for the remaining pixels in that row.

13 Claims, 13 Drawing Sheets

(56) References Cited

FOREIGN PATENT DOCUMENTS

| | | |
|---|---|---|
| JP | 2008-004101 A | 1/2008 |
| JP | 2008-027036 A | 2/2008 |
| JP | 2010-039624 A | 2/2010 |
| WO | 03/041014 A1 | 5/2003 |
| WO | 2006/049430 A1 | 5/2006 |
| WO | 2007/148942 A1 | 12/2007 |
| WO | 2008/010544 A1 | 1/2008 |

FIG. 2

| Y | KINDS OF IMAGE | THRESHOLD |
|---|---|---|
| 1 | ORIGINAL IMAGE | 120 |
| 2 | ORIGINAL IMAGE | 150 |
| 3 | ORIGINAL IMAGE | 200 |
| 4 | RED COMPONENT IMAGE | 120 |
| 5 | GREEN COMPONENT IMAGE | 120 |
| 6 | BLUE COMPONENT IMAGE | 120 |

FIG. 10

| IDENTIFICATION INFORMATION | ITEM CODE | ITEM KIND | NUMBER OF PIECES | STORAGE START DATE | SHIPMENT (STORAGE) DEADLINE | USE-BY DATE |
|---|---|---|---|---|---|---|
| 00001 | K-01F-001 | ELECTRIC COMPONENT | 5 | 2010/5/1 | 2010/5/6 | NONE |
| 00002 | K-01F-002 | ELECTRIC COMPONENT | 5 | 2010/7/1 | 2010/7/7 | NONE |
| ... | ... | ... | ... | ... | ... | ... |
| 000013 | E-03B-001 | CHEMICALS | 20 | 2010/2/5 | 2010/8/5 | 2011/2/5 |
| 000014 | E-03B-002 | CHEMICALS | 20 | 2010/4/1 | 2010/10/1 | 2011/4/1 |
| 000015 | E-03B-003 | CHEMICALS | 20 | 2010/6/1 | 2010/12/1 | 2011/6/1 |
| ... | ... | ... | ... | ... | ... | ... |
| 000025 | S-07D-001 | FOOD | 1 | 2010/7/7 | NONE | 2011/10/7 |
| 000026 | S-07D-002 | FOOD | 1 | 2010/5/13 | NONE | 2011/6/15 |
| 000027 | S-07D-003 | FOOD | 1 | 2010/4/17 | NONE | 2011/10/30 |
| 000028 | S-07D-004 | FOOD | 1 | 2010/3/23 | NONE | 2011/5/1 |
| 000029 | S-07D-005 | FOOD | 1 | 2010/2/14 | NONE | 2011/3/14 |
| ... | ... | ... | ... | ... | ... | ... |

|   | DATE OF WAREHOUSING | ITEM NAME |
|---|---|---|
| (1) | 2010/2/5 | E-03B-001 |
| (2) | 2010/4/1 | E-03B-002 |
| (3) | 2010/6/1 | E-03B-003 |
|   | SHIPMENT DEADLINE | USE-BY DATE |
| (1) | 2010/8/5 | 2011/2/5 |
| (2) | 2010/10/1 | 2011/4/1 |
| (3) | 2010/12/1 | 2011/6/1 |

TWO-DIMENSIONAL CODE READER AND PROGRAM

TECHNICAL FIELD

The present invention relates to a two-dimensional code reader that identifies a two-dimensional code read from an image obtained by shooting an image of a region including one or more two-dimensional codes.

BACKGROUND ART

A technique has been used that specifies a two-dimensional code region from an image indicating a two-dimensional code and identifies information coded in the two-dimensional code (see Patent Document 1).

When a two-dimensional code is configured to include a plurality of cells arranged such that one or more pieces of information are coded in accordance with a color given to each cell or a combination of colors, the color of each cell has to be determined in order to identify information. The determination of colors is made for the colors used in the two-dimensional code by determining colors of all pixels in a region of a cell and based on the results of the determinations.

[Patent Document]
[Patent Document 1] JP-A-2001-195536

DISCLOSURE OF INVENTION

Problem to be Solved by the Invention

The technique of Patent Document 1 above uses, as an image acquired to identify information, an image which contains one two-dimensional code throughout most of the image region. From this image it is impossible to specify each of a plurality of two-dimensional codes included in an image in which the two-dimensional codes are contained in a region.

For example, when the area of a two-dimensional code is large, when the area of each cell is large, or when the area and the number of cells are large, color determination processing for all the pixels that constitute each cell significantly increases the time required for the color determination processing.

In view of the above-mentioned problems, the present invention provides a technique for specifying each of a plurality of two-dimensional codes included in an image and for reducing the time required for color determination processing for a region of each cell in the specified two-dimensional code.

Means for Solving Problem

[First Aspect]
To solve the problem as described above, a two-dimensional code reader in a first aspect of the present invention includes an image acquisition unit, a component conversion unit, a region extraction unit, a pattern determination unit, a region detection unit, a color determination unit, and an information identifying unit. The image acquisition unit acquires an image formed by shooting a region including a plurality of two-dimensional code regions. Each of the two-dimensional code regions is configured to include a plurality of cells arranged. The cells are each colored such that the cells include cells of a plurality of kinds in different colors to code one or more pieces of information in accordance with colors given to the cells or a combination of colors. The component conversion unit converts the image acquired by the image acquisition unit into an edge image indicating the distribution of edge components included in the image. The region extraction unit extracts a region formed in conformity with a predetermined rule from the edge image converted by the component conversion unit, as a candidate region containing the corresponding two-dimensional code region. The pattern determination unit determines, for a corresponding region that corresponds to the candidate region that is extracted by the region extraction unit in the image acquired by the image acquisition unit, whether a characteristic pattern defining the two-dimensional code region is included in elements forming the corresponding region. The region detection unit is capable of detecting each of the two-dimensional code regions included in the image by detecting, as the two-dimensional code region, the corresponding region that is determined by the pattern determination unit to include the characteristic pattern. The color determination unit determines a color given to a region of each cell in each of the two-dimensional code regions detected by the region detection unit. The information identifying unit identifies the coded information on the basis of a color given to the region of each cell or a combination of colors, based on the assumption that the region of each cell in the two-dimensional code region is given the color determined for the region of the cell by the color determination unit.

The color determination unit successively determines a color of a region of each cell in the two-dimensional code region, pixel by pixel. When a particular number of determination results with a valid color has been obtained, the color determination unit omits color determination processing for remaining pixels not yet subjected to color determination processing. The color determination unit then determines a color given to the region of each cell on the basis of the particular number of determination results with a valid color.

In this configuration, a two-dimensional code region can be detected from the acquired image (original image) on the basis of edge images generated from the original image, through extraction of a candidate region in the edge image and determination as to whether a characteristic pattern is included in a corresponding region in the original image that corresponds to an extracted candidate region.

In this manner, among corresponding regions in the original image region that correspond to candidate regions in the edge image, a corresponding region including a characteristic pattern is detected as a two-dimensional code region in the original image. Thus, the respective two-dimensional codes included in the original image can be specified.

In the configuration above, the coded information can be specified for respective two-dimensional code regions detected based on the edge images, on the basis of the color given to a region of each cell in this two-dimensional code region.

In the configuration above, candidate regions serving as candidates for two-dimensional code regions are extracted from the acquired image. Thereafter, information can be identified by detecting a two-dimensional code region from these candidate regions. A two-dimensional code region can therefore be detected from the extracted candidate regions, that is, a more limited range when compared with a case where a two-dimensional code region is to be detected without extracting candidate regions. This can reduce the processing load and processing time required to identify information from a two-dimensional code region.

In the configuration above, the color is successively determined pixel by pixel in a region of each cell in a two-dimensional code region. When a particular number of determination results with a valid color has been obtained, the color determination processing is omitted for the remaining pixels not yet subjected to color determination. The color given to a region of each cell can be determined based on a particular number of determination results with a valid color.

Thus, when a particular number of color determination results with a valid color has been obtained for a plurality of pixels that constitute a region of each cell, color determination processing is not performed for the remaining unprocessed pixels. This can reduce the processing time required for color determination in a region of each cell.

In this configuration, the edge image converted from the original image is any image that indicates the distribution of edge components included in the original image. Examples thereof include an image in which only components equal to or greater than a particular threshold are extracted (specifically, binarized with a threshold) in an image having the distribution of a particular component such as luminance or lightness in the original image, or an image in which an outline is extracted from this image.

"A predetermined rule" for extracting a candidate region from an edge image is any rule that defines a candidate region formed of a two-dimensional code region. For example, the following may be defined by the predetermined rule: an outer shape of a two-dimensional code region; the length of respective sides or the angle formed with two adjacent sides in a case where the outer shape is polygonal; the ratio in length of sides in a case where the outer shape is polygonal; or a distribution pattern of edge components (the distribution state of edge components or the arrangement of distributed edge components) in a case where a two-dimensional code region is included in an edge image.

"A characteristic pattern" referred to when a two-dimensional code region is detected from the original image is any information that directly or indirectly indicates a characteristic pattern defined for the two-dimensional code. Examples of the characteristic pattern include the following: an arrangement pattern of cells serving as symbols for coding in a two-dimensional code; an arrangement pattern of specific symbols arranged for identifying a two-dimensional code; and information directly or indirectly indicating a pattern of marks arranged for identifying a two-dimensional code.

"A particular number of determination results with a valid color" is the number of determination results with a valid color with such accuracy that allows the color of a region of each cell to be determined precisely. A smaller number is preferred in view of the processing speed.

"A valid color" is, for example, a color having the largest number of determination results in a case where there are a plurality of color determination targets. The valid color is the color corresponding to a region of each cell in a case where the color given to a region of a cell is known beforehand or can be estimated based on arrangement order of colors.

[Second Aspect]

In the two-dimensional code reader in a second aspect according to the first aspect, the cells are divided by a separator given a predetermined color. The two-dimensional code reader further includes: a separator-region specifying unit specifying the location of a region of the separator in the two-dimensional code region by performing color determination processing on respective pixels in the two-dimensional code region on the basis of the predetermined color; and a cell-region specifying unit specifying the location of a region of each cell of the two-dimensional code region on the basis of the location of the region of the separator specified by the separator-region specifying unit.

In this configuration, the cells are divided by a separator given a predetermined color. The location of the region of the separator can be specified by performing color determination processing for respective pixels in the two-dimensional code region on the basis of the predetermined color. In addition, the location of the region of each cell can be specified based on the specified location of the region of the separator.

Consequently, the location of the region of each cell can be grasped from the location of the region of the separator. Therefore, after a particular number of determination results with a valid color has been obtained in a region of each cell, the processing can readily omit color determination processing for the remaining pixels in the region of each cell to proceed to color determination processing in the region of the next cell.

In this configuration, "a predetermined color" is preferably a color other than a color given to cells. For example, the "predetermined color" may be the same as the color of a special cell such as a cell specifying the location or direction of a two-dimensional code region, if it is included.

[Third Aspect]

In the two-dimensional code reader in a third aspect according to the second aspect, the color determination unit can successively determine respective colors of pixels, pixel group by pixel group that forms a row or a column in the two-dimensional code region. When a particular number of determination results with a valid color has been obtained in a part corresponding to a region of each cell of each row or each column, the color determination unit omits color determination processing for remaining pixels not yet subjected to color determination processing in that row or column up to a pixel immediately before a pixel indicating a region of a next cell. The color determination unit then determines a color given to the region of each cell on the basis of the determination result with the color for each row or each column for the region of each cell.

In this configuration, color determination processing for pixels can be performed successively pixel group by pixel group that forms a row or a column in the entire two-dimensional code region. When a particular number of determination results with a valid color has been obtained for each column or each row in a part of a region of each cell, color determination processing can be omitted for the remaining pixels in each row or each column in that cell.

In this manner, when a particular number of determination results with a valid color has been obtained in each row or each column in a region of each cell, color determination processing is not performed for the remaining unprocessed pixels. This can reduce the processing time required for color determination processing in a region of each cell.

[Fourth Aspect]

In the two-dimensional code reader in a fourth aspect according to the second aspect, the color determination unit successively determines respective colors of pixels, pixel group by pixel group that forms a row or a column, in a region of each cell in the two-dimensional code region. When a particular number of determination results with a valid color has been obtained in each row or each column corresponding to a region of each cell, the color determination unit omits color determination processing for remaining pixels not yet subjected to color determination processing in that row or column up to a pixel immediately before a pixel indicating a region of a next cell. The color determination unit then determines a color given to a region of each cell on the basis of the determination result with the color of each row or each column.

In this configuration, color determination processing for pixels can be successively performed pixel group by pixel group that forms a column or a row for a region of each cell in a two-dimensional code region. When a particular number of determination results with a valid color has been obtained for each row or each column in a region of each cell, color determination processing can be omitted for the remaining pixels in each row or each column in the region of the cell.

In this manner, when a particular number of determination results with a valid color has been obtained in each row or each column of a region of each cell, color determination processing is not performed for the remaining unprocessed pixels. This can reduce the processing time required for color determination processing in a region of each cell.

The color determination processing for pixels is performed cell by cell. This enables determination of the color given to a region of a cell for which determination processing is finished, before color determination processing for pixels is performed for a region of the next cell. This is effective when it is desired to know the arrangement order of colors of cells before color determination processing for the next cell is performed.

[Fifth Aspect]

The two-dimensional code reader in a fifth aspect according to any one of the first to fourth aspects further includes a repetitive execution unit and an agreement determination unit. The repetitive execution unit successively allows conversion of the image into an edge image by the component conversion unit with one or more different kinds of conversion conditions. The repetitive execution unit also repeatedly allows, for each of the edge images converted with the conversion conditions, extraction of the candidate region by the region extraction unit, determination of the characteristic pattern by the pattern determination unit, and detection of the two-dimensional code regions by the region detection unit. The agreement determination unit determines whether a candidate region extracted by the region extraction unit for a particular edge image agrees with a candidate region extracted by the region extraction unit (hereinafter referred to as "the already-extracted candidate region") for another edge image, on the basis of both of the candidate regions.

The repetitive execution unit allows determination by the pattern determination unit as to whether the characteristic pattern is included and detection of the two-dimensional code regions by the region detection unit, only for a candidate region determined by the agreement determination unit not to agree with the already-extracted candidate region, among the candidate regions extracted by the region extraction unit.

In this configuration, extraction of a candidate region, determination as to whether a characteristic pattern is included in a corresponding region corresponding to the extracted location information, and detection of a two-dimensional code region are repeatedly performed for different kinds of edge images generated based on the original image.

Consequently, it can be expected that even when a two-dimensional code region cannot be detected based on a particular edge image, a two-dimensional code region is detected based on another edge image. This leads to the improvement of accuracy in detecting a two-dimensional code region in the original image.

During the course of this repetition, it is conceivable that a candidate region that is newly extracted from a particular edge image agrees, in the region of the original image, with an already-extracted candidate region extracted from an edge image previously referred to. In the configuration above, determination as to whether a characteristic pattern is included in the extracted candidate region and detection of a two-dimensional code region are not performed for the already-extracted candidate region that thus agrees.

This can eliminate unnecessary processing load, such as repeated identification of two-dimensional code regions that should originally be identical, during the identification of information indicated by the two-dimensional code region detected based on a plurality of edge images.

[Sixth Aspect]

In the two-dimensional code reader in a sixth aspect according to any one of the first to fifth aspects, respective colors given to the cells in the two-dimensional code are defined in conformity with a coloring rule according to information to be coded with the cells and colors given to cells adjacent to the cells, among different kinds of colors. The two-dimensional code reader further includes a color estimation unit. The color estimation unit estimates, in conformity with the coloring rule, a color that should originally be given to a region of a cell that is given a color other than a color to be given in conformity with the coloring rule to the region of the cell or other than a color to be used in the two-dimensional code, among the regions of the cells in the respective two-dimensional code regions detected by the region detection unit. The information identifying unit identifies information on the basis of colors given to regions of the cells or a combination of colors, based on the assumption that the estimated color is given to the region of the cell whose color is estimated by the color estimation unit, among the regions of the cells in the two-dimensional code region.

The fifth aspect above has no problem if the entire two-dimensional code is generated normally as an image. However, a two-dimensional code may not be generated normally as an image, for example, in a case where a region corresponding to part of cells is impaired, depending on the state of generating (specifically, shooting) an image. This case results in a failure in the identification itself of information.

For such a problem, it is preferred to compensate for deficiencies such as am impaired region corresponding to part of cells to make it possible to identify information appropriately.

With the sixth aspect above, even when a region corresponding to part of cells in a two-dimensional code is impaired, the color that should originally be given to the cells is estimated in conformity with the coloring rule, thereby allowing information to be identified based on the estimated color. This can prevent a failure in the identification itself of information.

In this configuration, in a case where a plurality of colors are estimated as colors of cells estimated in conformity with the coloring rule, any one of those colors may be selected based on, for example, a parameter such as the probability of the estimation result, and it may be estimated that the color thus selected is given. In the case where a plurality of colors are estimated, information may be identified for each pattern having a plurality of colors, and any one of the information thus identified may be selected by the user.

[Seventh Aspect]

In the two-dimensional code reader in a seventh aspect according to any one of the first to sixth aspects, the color determination unit determines a color given to a region of each cell in the two-dimensional code region, on the basis of which determination region the color is included in, in a color space expanding around each of a plurality of colors used in the two-dimensional code.

With this configuration, the color given to a region of each cell in a two-dimensional code can be determined based on which determination region in a color space the color is included in.

[Eighth Aspect]

In the two-dimensional code reader in an eighth aspect according to the seventh aspect, for a two-dimensional code region that contains a certain number or more of regions of cells determined not to be included in any of the determination regions corresponding to a plurality of colors, the color determination unit expands the determination regions by a certain region and thereafter determines a color given to the region of each cell again.

In the seventh aspect above, a color given to many regions of cells may not be included in any determination region due to the conditions of generating an image. This case results in a failure in the identification itself of information.

For such a problem, even when a color given to many regions of cells is not included in any determination region, it is preferred to compensate for this and make it possible to identify information appropriately.

With the eighth aspect above, even when the conditions of generating an image are so bad that a color determination cannot be made appropriately, the color is determined again with determination sensitivity improved by expanding the determination regions. This can increase the probability of color determination.

In this configuration, the range of extension in expanding a determination region may be set up to a range that does not interfere with other determination regions. Another determination may be repeated by gradually expanding the determination regions until the number of cells determined not to be included in any determination region becomes less than a certain number.

[Ninth Aspect]

In the two-dimensional code reader in a ninth aspect according to the seventh aspect, for a two-dimensional code region that contains a certain number or more of regions of cells determined not to be included in any of the determination regions corresponding to a plurality of colors, the color determination unit shifts the determination regions in the color space in accordance with the color distribution in the two-dimensional code region. The color determination unit thereafter determines a color given to the region of each cell again.

With this configuration, even when the conditions of generating an image are so bad that a color determination cannot be made appropriately, the color can be determined again with the determination region shifted to an appropriate position according to the color distribution. This can increase the probability of color determination.

In this configuration, the determination region may be shifted to a position in the color space where a deviation of a color component in the two-dimensional code region can be canceled. More specifically, the determination regions may be shifted in a direction to reduce a particular color component being large as a whole in the two-dimensional code region.

In the eighth and ninth aspects above, the "certain number" in " . . . contains a certain number or more of regions of cells determined not to be included in any of the determination regions" may be represented as a proportion of applicable cells to all the cells, or the absolute number of applicable cells. Alternatively, it may be the number of applicable cells arranged in a particular pattern in a two-dimensional code.

[Tenth Aspect]

In the two-dimensional code reader in a tenth aspect according to any one of the fifth to ninth aspects, the agreement determination unit determines whether each of the candidate regions extracted by the region extraction unit for a particular edge image agrees with the already-extracted candidate region in another edge image, depending on the degree of overlap between both candidate regions.

In this configuration, the agreement determination unit determines whether each candidate region extracted by the region extraction unit for a particular edge image agrees with the already-extracted candidate region in another edge image, depending on the degree of overlap between both candidate regions.

With this configuration, it can be determined that the candidate region extracted from a particular edge image and the already-extracted candidate region in another edge image agree on the basis that the degree of overlap between the two is equal to or greater than a certain level, depending on the degree of overlap.

[Eleventh Aspect]

In the two-dimensional code reader in an eleventh aspect according to any one of the fifth to tenth aspects, the agreement determination unit determines whether each of the candidate regions extracted by the region extraction unit for a particular edge image agrees with the already-extracted candidate region in another edge image, depending on whether one of the candidate regions is embraced in the other candidate region.

With this configuration, it is possible to determine that the candidate region extracted from a particular edge image and the already-extracted candidate region in another edge image agree on the basis that one of those candidate regions is embraced in the other candidate region.

[Twelfth Aspect]

In the two-dimensional code reader in a twelfth aspect according to any one of the fifth to eleventh aspects, in a case where the two-dimensional code regions are polygonal, the agreement determination unit determines whether each of the candidate regions extracted by the region extraction unit in a particular edge image agrees with the already-extracted candidate region in another edge image, on the basis of whether one or more vertices of a polygon formed as the candidate region are located within a certain range from any one of the vertices of a polygon formed as the already-extracted candidate region.

With this configuration, on the basis that one or more vertices of a candidate region extracted from a particular edge image is located within a certain range from any one of the vertices of the already-extracted candidate region, it can be determined that both candidate regions agree.

The term "within a certain range from any one of the vertices" here may be set as within a range determined by the positional relation between the candidate region extracted from a particular edge image and the already-extracted candidate region in another edge image when the two agree.

The condition for determining that both candidate regions agree may be such that at least one vertex of the candidate region extracted from a particular edge image is located within a certain range from any one of the vertices of the already-extracted candidate region in another edge image. It may be determined that both candidate regions agree on a condition that some vertices are located within a certain range. The conditions may be changed as appropriate in accordance with the processing load and processing speed required to detect a two-dimensional code region.

[Thirteenth Aspect]

In the two-dimensional code reader in a thirteenth aspect according to any one of the first to twelfth aspects, based on a template that defines a rule for forming each of the two-dimensional code regions, the region extraction unit extracts, as positional information of the corresponding candidate region, location information of a region formed in conformity with the rule defined by the template from the edge image converted by the component conversion unit.

With such a configuration, a candidate region can be extracted in accordance with the rule defined by the template. Changing the template as well as the rule enables detection of a region formed in conformity with an arbitrary rule as a candidate region.

The two-dimensional code reader as described above may be configured as a single device or may be configured as a system including a plurality of devices operating in cooperation with each other.

[Fourteenth Aspect]

A fourteenth aspect for solving the above-mentioned problem may provide a program that causes a computer system to execute a variety of processing procedures functioning as the components described in any one of the first to thirteenth aspects.

The computer system controlled by such a program can configure part of the two-dimensional code reader according to the foregoing aspects.

Each program described above is composed of an orderly sequence of instructions suited for processing by a computer system, and is provided to the two-dimensional code reader or the user using the two-dimensional code reader through a variety of recording mediums or a communication line.

BRIEF DESCRIPTION OF DRAWINGS

FIG. 2 is a diagram showing a configuration example of a two-dimensional code 100.

FIG. 10 is a diagram showing an example of identification information and article information registered in a database.

BEST MODE(S) FOR CARRYING OUT THE INVENTION

In the following, an embodiment of the present invention will be described with reference to the figures.

(1) Configuration of Two-Dimensional Code Reader 1

Figure 1:
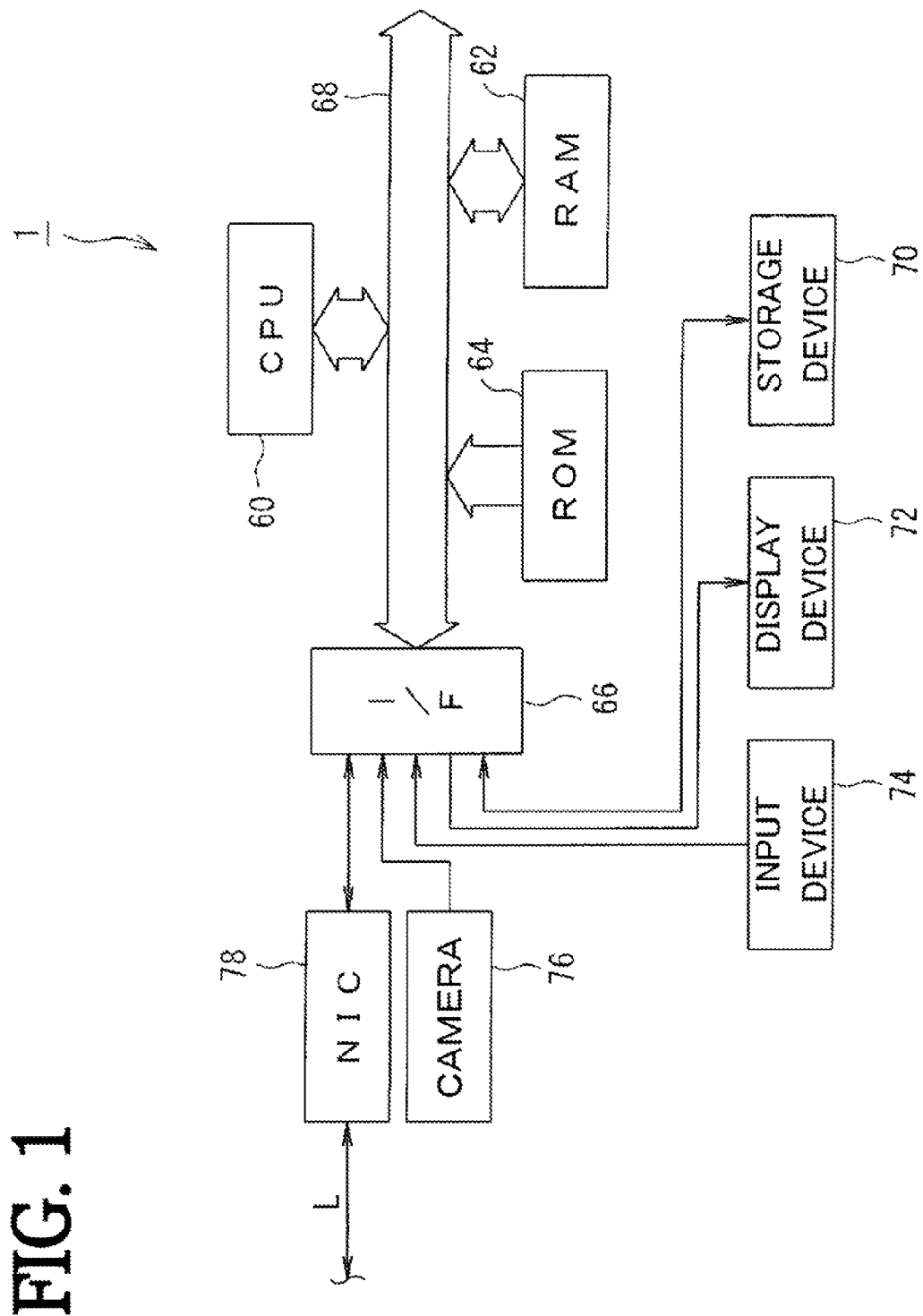
FIG. 1 is a block diagram showing a configuration example of a two-dimensional code reader 1.

First, a configuration of a two-dimensional code reader 1 will be described with reference to FIG. 1. FIG. 1 is a block diagram showing a configuration example of the two-dimensional code reader 1.

As shown in FIG. 1, the two-dimensional code reader 1 includes a computer system configured to include a central processing unit (CPU) 60, a random access memory (RAM) 62, a read-only memory (ROM) 64, an input/output interface (I/F) 66, and a bus 68. The CPU 60, the RAM 62, the ROM 64, and the I/F 66 are connected to the bus 68, so that data can be transmitted/received among those connected devices through the bus 68.

The two-dimensional code reader 1 is further connected to a storage device 70, a display device 72, an input device 74, a camera 76, and a network interface card (NIC) 78 through the I/F 66.

The CPU 60 reads into the RAM 62 a variety of dedicated computer programs stored in the ROM 64 or the storage device 70 in advance and executes article detection processing using a two-dimensional code described later (hereinafter referred to as the code-using article detection processing) by utilizing a variety of resources in accordance with instructions that are written in the program read into the RAM 62.

The storage device 70 stores data necessary for the code-using article detection processing, such as a variety of dedicated computer programs and data to be used in the execution of the programs.

Specifically, the storage device 70 stores a template that defines information characterizing a two-dimensional code, and image data obtained by shooting an image with the camera 76.

The storage device 70 further stores a data table in which the correspondence is registered between a color or a color combination for each cell group unique in each two-dimensional code and information including information unique to each two-dimensional code.

The storage device 70 further stores a database in which information is registered that associates information (hereinafter referred to as article information) on an article having a two-dimensional code, with unique information (identification information) of each two-dimensional code. Specifically, in the database, the identification information (for example, the name or the serial number) of an article, number-of-pieces information, storage-start-time information such as the date of warehousing, and expiration date information such as a shipment deadline and a use-by date, for example, are associated with unique information included in each two-dimensional code to be registered in the database.

Here, the storage device 70 may be any storage device whose storing data can be read by a computer, for example, a magnetic storage-type storage device such as a FD drive and an HD drive, an optical read/write-type storage device such as a CD drive, a DVD drive, and a BRD drive, and a magnetic storage/optical read-type storage device such as an MO drive.

The display device 72 is a well-known display device such as a CRT display and a liquid crystal display. The display device 72 displays an image (including motion image) such as an image shot by the camera 76 and a processed image obtained by processing the image, in accordance with an instruction from the CPU 60.

The input device 74 is a human interface device such as a keyboard, a mouse, an operation button, and a touch-type input device (for example, a touch panel). The input device 74 accepts an input according to the operation made by the user.

The camera 76 is a well-known camera such as a digital camera. The camera 76 generates image data that indicates an image obtained by shooting a particular shooting region, and successively transmits the image data generated to the RAM 62 or the storage device 70 through the I/F 66 for storing the image data into the RAM 62 or the storage device 70.

The NIC 78 is a device for communicating with an external device on a network such a LAN, a WAN or the Internet, and is a well-known network adapter generally called a LAN card. The NIC 78 is connected to a router, a hub, and the like through a network cable L to connect the two-dimensional code reader 1 to the network therethrough. The NIC 78 may include a configuration such as a well-known wireless LAN to wirelessly connect to the network through an access point for the wireless LAN.

Consequently, in the present embodiment, image data indicating a shot image in a particular shooting region can be acquired through the NIC 78 from an external camera connected to the network. In addition, a variety of data can be acquired from a data server connected to the network.

The two-dimensional code reader 1 is configured to be implemented on, for example, a mobile phone terminal, a portable information terminal, and a well-known personal computer.

The two-dimensional code reader 1 in the present embodiment is configured as an apparatus that performs the following processing: processing of detecting a two-dimensional code in an image that includes a plurality of articles and one or more two-dimensional codes attached to each of the articles, on the basis of image data indicating the image; and processing of identifying and acquiring information indicated by the two-dimensional code detected. The two-dimensional code reader 1 is further configured as a device that performs the following processing: determining whether an article designated to be detected exists among the articles corresponding to the identification information acquired; and, if there exists an article to be detected, processing an original image for highlighting a two-dimensional code region corresponding to the article and then displaying the processed image.

In the present embodiment, each processing described above is performed in a series of processing that is triggered by the input of an operation by the user (instruction information) through the input device 74.

(2) Configuration of Two-Dimensional Code 100

Figure 2:
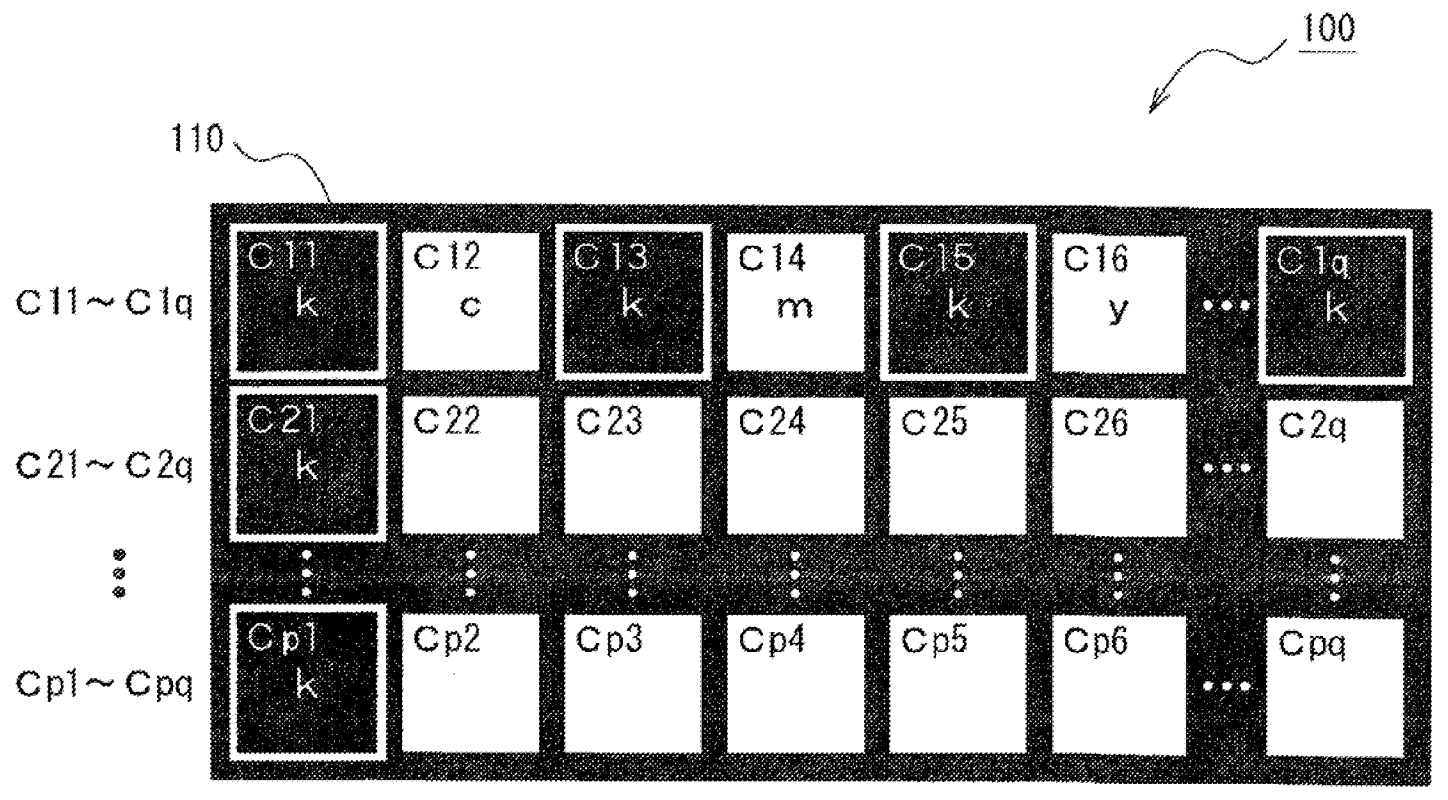

A two-dimensional code 100 read by the two-dimensional code reader 1 will now be described with reference to FIG. 2. FIG. 2 is a diagram showing a configuration example of the two-dimensional code 100.

As shown in FIG. 2, the two-dimensional code 100 in the present embodiment includes a plurality of cells C11 to Cpq ($2 \leq p$, $2 \leq q$) that are arranged at regular intervals on a black separator 110. In the two-dimensional code 10, particular information is coded with a color of each cell and a color combination. In other words, in the two-dimensional code, the cells or the cell groups in combination can represent different kinds of values (multiple value) such as numerals and characters by a plurality of colors (multiple color) given to the cells or the cell groups, or a color combination pattern. For example, information unique to each two-dimensional code can be allocated by varying color combinations or color arrangement patterns among a plurality of two-dimensional codes.

Here, the cells C11 to C1$q$ in a first row (the row on the top in FIG. 2) that constitute this two-dimensional code serve as a header region marked in order with colors of marks that may be given to cells C in a two-dimensional code (the cells C are filled).

In the present embodiment, cells colored with one or more colors excluding black (k), as colors of marks that may be put to cells C, are arranged each making a set with a cell C marked with black (k).

Of the cells in each row, the cells C11 to Cp1 (the cells with black (k) in the present embodiment) located at the front (the column on the left end in FIG. 2) are disposed as specifying cells for specifying the location of the two-dimensional code.

The cells C11 to Cpq (excluding the cells C11 to Cp1 at the front) on the second and subsequent rows are divided for each row into cell groups that each include one or more cells C, and are each marked with a color or a color combination associated with unit information (one or more characters) to be indicated by each cell group. Thus, each cell or each cell group in one or more combinations can have information composed of any of different kinds of characters or any value indicated by a multi-adic number.

The colors of the marks given to these cells C are determined by a component model in which, in a three-dimensional space representing distributions of cyan C, magenta (m), and yellow (y), a plurality of component regions (determination regions described later) spherically extending as three-dimensional regions are arranged in such size and positional relation that these component regions do not interfere with each other. Specifically, the cell group is marked such that each component represented by the center coordinates of a component region arranged in this component model is as a component of an information color or a component of each color in a combination color.

"The component regions do not interfere with each other" referred to herein means that the component regions are arranged at a distance from each other or the boundaries of the component regions are arranged to be adjacent to each other so that the component regions do not overlap each other.

The size of each component region is defined as a space that can fully embraces the range of errors that may occur depending on the image shooting environment. In the present embodiment, the color at specific coordinates is set as a color in a general shooting environment, and a region including the range of errors from this color that may occur depending on the shooting environment is defined as a component region.

The color (in the present embodiment, a black-based color) of the center coordinates of the component region that is not used for the colors of marks put to the cells C is used as the color of the mark given to the specifying cell and the color of the separator 110 in the two-dimensional code 100.

(3) Processing by CPU 60

The procedures performed in a variety of processing processes executed by the CPU 60 in accordance with a dedicated computer program stored in the ROM 64 or the storage device 70 will now be described below one by one.

(3-1) Code-Using Article Detection Processing

A processing procedure of the code-using article detection processing, which is initiated in response to an instruction from a user through the input device 74 during the reception of image data from the camera 76 by the two-dimensional code reader 1, will be described with reference to FIG. 3.

Figure 3:
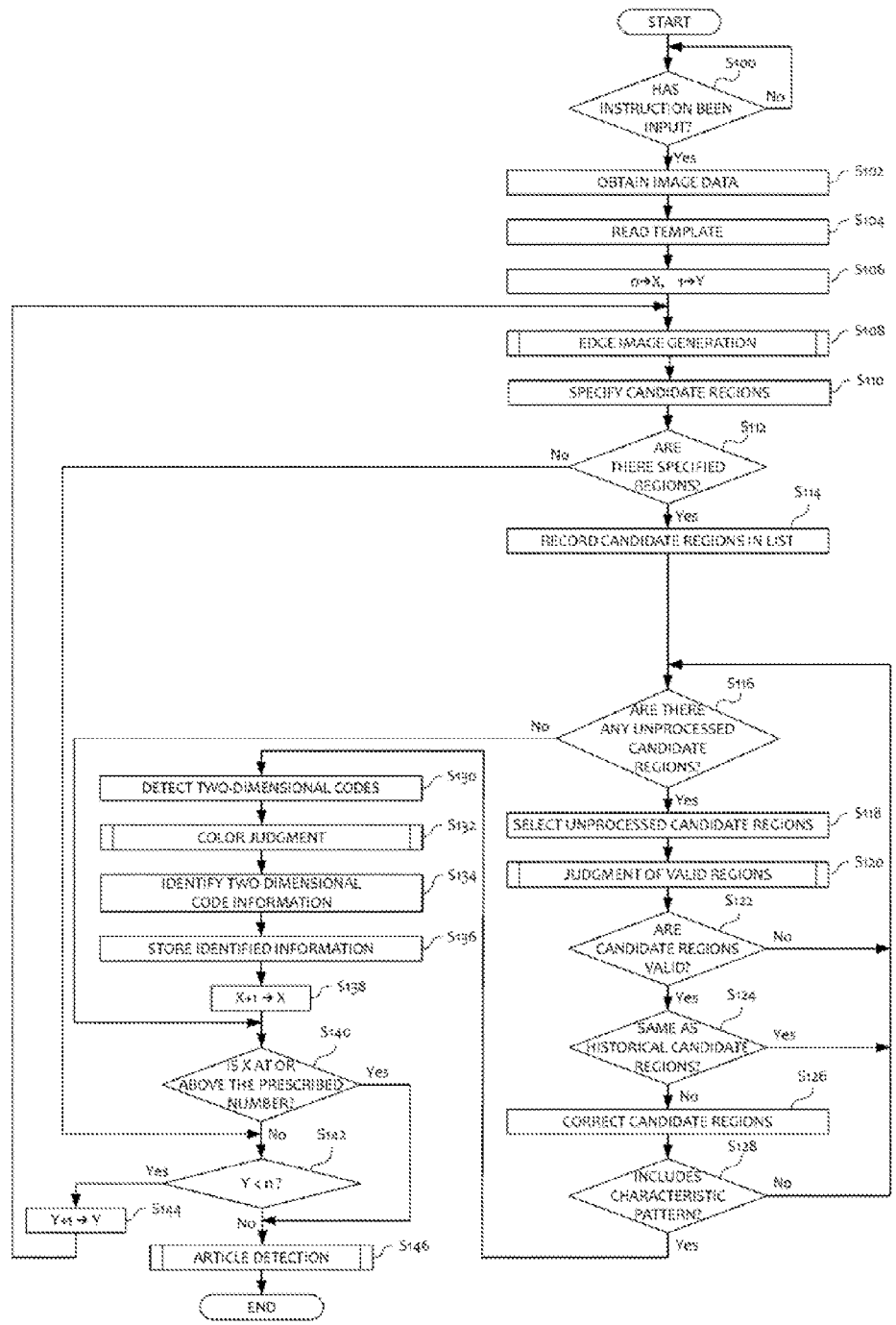
FIG. 3 is a flowchart showing an example of a processing procedure of code-using article detection processing.

Here, FIG. 3 is a flowchart illustrating an example of the processing procedure of the code-using article detection processing.

Upon the start of the code-using article detection processing, first, a two-dimensional code region is detected through the following procedures: generating edge image data from image data obtained with the camera 76; extracting a candidate region from the edge image data; determining whether the candidate region is valid or not; and determining whether the region corresponding to the valid candidate region in the original image includes a characteristic pattern.

Next, the information of the two-dimensional code having been detected is identified through the following procedures on the region detected of the two-dimensional code: detecting the separator 110; dividing cell regions; determining the color of each cell region (including a correction and a re-determination); and cross-checking the determination results of the color for each cell region.

Subsequently, an image in which the position of the article to be detected in the original image is clearly shown is displayed in accordance with a preset detection mode, through the following procedures: specifying the two-dimensional code corresponding to the article to be detected; processing the original image; and displaying the processed image. Specifically, processing the image includes processing on the original image (a copy image thereof is also possible) such as highlighting (for example, marking or changing colors) an image portion of the two-dimensional code specified in the original image, and adding an information image (for example, a character image) related to the article in accordance with a detection mode. Consequently, an image obtained by adding to the original image an image (or effect) clearly showing the position of the article to be detected and an information image in accordance with the mode for the article is displayed on the display device 72.

In the present embodiment, the detection modes that can be set include an article detection mode of detecting a designated article from among the articles provided with two-dimensional codes included in the original image, and an expiration-date management mode of detecting therefrom an article after the shipment deadline or the use-by date.

The code-using article detection processing is activated by the CPU 60 executing a dedicated computer program. When the program is executed, the processing proceeds to step S100 first as shown in FIG. 3.

At step S100, it is determined whether an instruction from a user is given through the input device 74. If it is determined that an instruction input is given (Yes), the processing proceeds to step S102. If not (No), the determination processing continues until an input is made.

Here, when the article detection mode is set, it is necessary to set identification information of an article to be detected, such as the serial number of the article and the name, before an instruction input is made. For this setting, the user may manually input information identifying a product to be detected through the input device 74, or the user may select identification information such as the article name from an article list being displayed, for example.

When the expiration-date management mode is set, identification information may be set in a similar manner as in the article detection mode. However, this setting is not required, for example, when it is desired to manage all the articles, as is the case with articles (products) ready for shipment that are piled in a warehouse or articles displayed on display shelves in a store. In the present embodiment, the processing of setting the identification information of the article is not performed in the expiration-date management mode.

In the present embodiment, the instruction input is processing performed by the user through the input device 74 while watching an image shot by the camera 76 that is displayed on the display device 72. The image being displayed when the instruction input is made is searched for the article to be detected.

When the processing proceeds to step S102 (Yes), the image data having been displayed at the time when the instruction input is made, or image data of a plurality of frames in addition to the image data is acquired from the RAM 62 or the storage device 70. The processing then proceeds to step S104.

Specifically, a single image at the time when the instruction input is made, or images of a plurality of frames preset with the time of the instruction input as the starting-point are acquired according to the mode or specifications having been set. Subsequently, the following processing is executed on the image data. In the present embodiment, it is assumed that a single image is acquired and the processing is performed on the single image acquired, for the sake of convenience of explanation.

At step S104, the template that defines information characterizing a two-dimensional code is read from the storage device 70. The processing then proceeds to step S106.

The template referred to herein is information indicating, for example, a region rule that defines a region containing a two-dimensional code, a characteristic pattern in a two-dimensional code, and a coloring rule of colors (the number of colors, the kinds of colors) given as a mark to a two-dimensional code.

Among those, the "region rule" may define, for example, a circular region such as a perfect-circular region or an oval region, a polygonal region such as a rectangular region or a triangular region, or a region having a shape similar thereto, in accordance with the outer shape of a two-dimensional code, for extracting a candidate region (specify coordinates) from an edge image. For example, when the outer shape of the two-dimensional code is rectangular, the similar shape is a shape, such as a trapezoidal region, in which a rectangular shape is viewed (shot) from a different angle. When the outer shape of the two-dimensional code is a perfect circle, the similar shape is a shape, such as a hexagonal or octagonal region, in which a circle is distorted due to the shooting environment or the image quality of the original image. For example, with the shape being ignored, the rule may define that any closed region is extracted as a candidate region. The rule may define that a region with a specific distribution pattern of edge components (for example, the distribution state of edge components or the arrangement of distributed edge components) is extracted.

To determine whether the extracted candidate region is valid, for example, the rule may define the ellipticity in a case where the extracted candidate region is circular, the length of the sides or the angle formed with two adjacent sides in a case where the outer shape is polygonal, or the ratio in length of the sides in a case where the outer shape is polygonal.

The "region rule" preferably defines a plurality of items selected in order to alleviate the processing load required for the subsequent processing. This can reduce the number of extracted candidate regions, leading to the reduction of the processing load and thus shortening of the processing time.

The "characteristic pattern" refers to the following, for example: an arrangement pattern of the cells serving as symbols for coding in the two-dimensional code; an arrangement pattern of specific symbols arranged for identifying a two-dimensional code; and a pattern of marks arranged for identifying a two-dimensional code.

For example, in the case of the two-dimensional code 100 illustrated in FIG. 2, the characteristic pattern indicating a two-dimensional code region is formed with both or one of the color given to the specifying cells C11 to C$p$1 and a plurality of colors given to the cells in the header regions C11 to C1$q$ described above.

The characteristic pattern may be implemented with another configuration such as the following: a configuration in which the region of the separator 110 is also included in the pattern; and a configuration in which, without the provision of the header region or the specifying cells, the characteristic pattern is formed with a plurality of colors given to the cells or a combination pattern thereof in the region indicating information (in the example in FIG. 2, the region in the second and subsequent rows excluding the specifying cells C11 to Cp1) or the arrangement order of the cells given a plurality of colors, for example.

The "coloring rule" is a rule of colors given to a plurality of cells in the two-dimensional code and is determined according to the information to be coded with appropriate cells, and the colors given to the appropriate cells and the cells adjacent thereto.

At step S106, variables X and Y referred to in the subsequent processing are initialized ($0 \rightarrow X$, $1 \rightarrow Y$). The processing then proceeds to step S108.

At step S108, edge-image generation processing is executed on the image data acquired at step S102 to generate edge image data. The processing then proceeds to step S110. A specific processing procedure of this edge-image generation processing will be described later.

At step S110, based on the edge image data generated at step S108, the position of each candidate region containing a two-dimensional code is specified from this edge image. The processing then proceeds to step S112. Here, based on the "region rule" in the template read out at step S104, the coordinates in the image that defines the candidate region containing a two-dimensional code are specified from the Y-th edge image.

In the present embodiment, the two-dimensional code 100 has the outer shape (rectangular shape) shown in FIG. 2. Thus, all the rectangular regions, which each are a closed region with a linearized outer line portion, are specified as candidate regions as "regions in conformity with the region rule." The "region in conformity with the region rule" includes not only a region in conformity with the region rule but also a region formed with parameters within a permissible error range for such a region. For example, not only a rectangular shape but also a trapezoidal shape, a parallelogram shape, and a rhombus shape are included as long as they fall within the error range.

At step S112, it is determined whether a candidate region is specified at step S110. If it is determined that it is specified (Yes), the processing proceeds to step S114. If not (No), the processing proceeds to step S140.

When the processing proceeds to step S114, the candidate regions (coordinate information) specified at step S110 are registered in a list. The processing then proceeds to step S116.

At step S116, it is determined whether there exists a (unprocessed) candidate region not yet set as a target to be processed in the subsequent processing, among the candidate regions registered in the list at step S114. If it is determined that there exists such a candidate region (Yes), the processing proceeds to step S118. If not (No), the processing proceeds to step S138. Here, if no candidate region is registered in the list, it is also determined that there are no unprocessed candidate regions.

When the processing proceeds to step S118, any one candidate region is selected from among the unprocessed candidate regions registered in the list. The processing then proceeds to step S120.

At step S120, valid-region determination processing is executed to determine whether the candidate region selected at step S118 is valid. The processing then proceeds to step S122. A specific processing procedure of this valid-region determination processing will be described later.

At step S122, it is determined whether the candidate region selected at step S118 is valid, on the basis of the determination result at step S120. If it is determined that it is valid (Yes), the processing proceeds to step S124. If not (No), the processing proceeds to step S116, and similar processing as described above is thereafter performed on another candidate region.

When the processing proceeds to step S124, it is determined whether the candidate region (new candidate region) specified at step S110 above that has been performed immediately before is the same as the candidate region (already-extracted candidate region) specified at step S110 above that is performed in the past.

Specifically, it is determined that the new candidate region is the same as the already-extracted candidate region when the new candidate region overlaps the already-extracted candidate region by a particular proportion as a region, or when one of the new candidate region and the already-extracted candidate region is embraced in the other.

Figure 4:
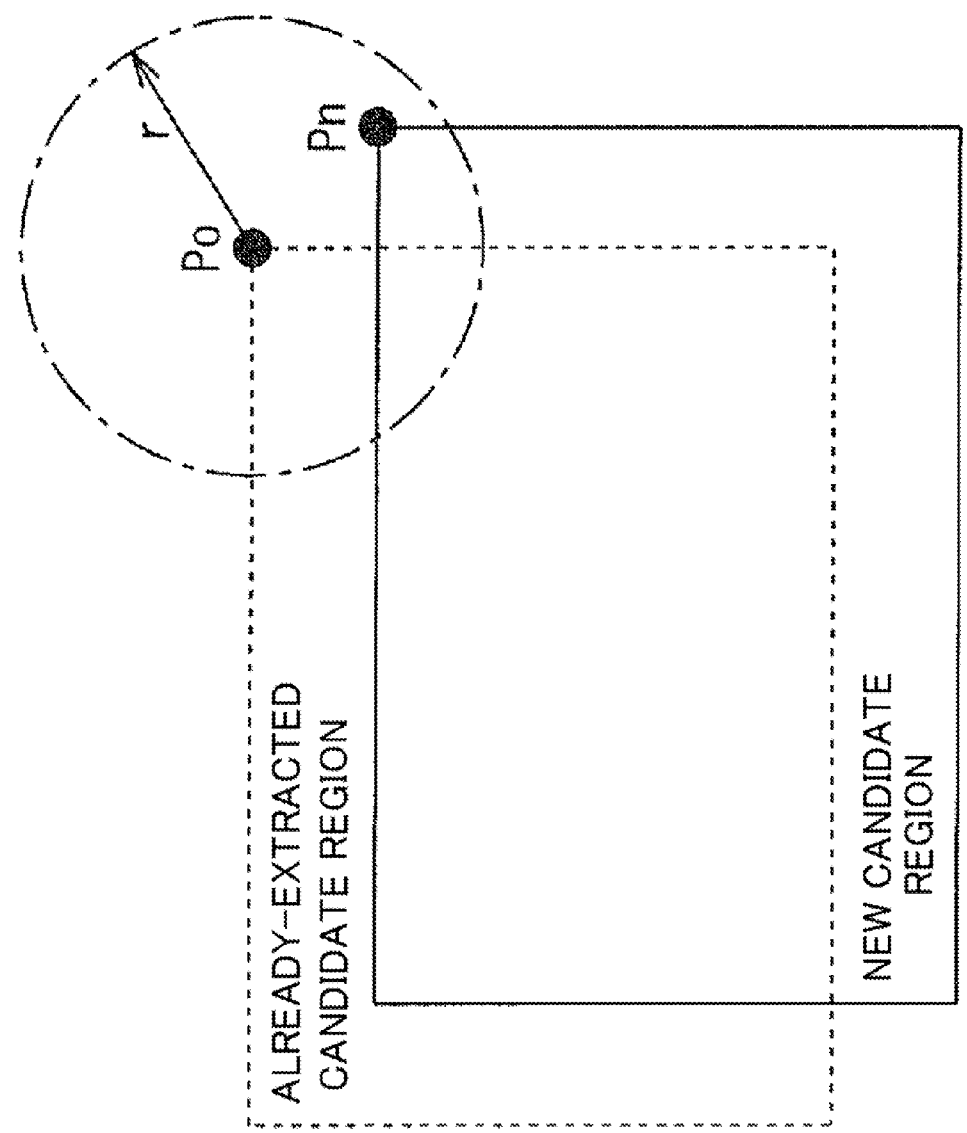
FIG. 4 is a diagram showing another technique for determining whether each candidate region extracted from the edge image agrees with an already-extracted candidate region.

In the present embodiment, a candidate region has a polygonal shape. Therefore, whether each candidate region extracted from an edge image agrees with the already-extracted region in another edge image may be determined depending on whether one or more vertices Pn of the polygon formed as a candidate region are located within a certain range (for example, a distance of a certain radius r) from any of the vertices Po of the polygon formed as the already-extracted candidate region (see FIG. 4).

The term "within a certain range from any of the vertices" here may be set as within a range determined by the relation between positions where the candidate region extracted from a particular edge image and the already-extracted candidate region in another edge image can be located in a case where both of those candidate regions agree with each other. This range is not limited to the distance of a certain radius r as described above.

Subsequently, if it is determined at step S124 that the new candidate region is the same as any of the already-extracted candidate regions that have been specified at step S110 above performed in the past and has been stored in the RAM 62 or the storage device 70 (Yes), the processing proceeds to step S116, and similar processing as described above is thereafter performed for another candidate region.

If it is determined at step S124 that the new candidate region is not the same as the already-extracted candidate region (No), the processing proceeds to step S126.

When the processing proceeds to step S126, the new candidate region at this point of time is corrected to be suitable for the identification of information. The processing then proceeds to step S128.

Here, the shape and the angle of the two-dimensional code in the new candidate region are corrected. Specifically, for example, when a region to be processed is arranged being tilted or has a distorted shape that is not a square, such displacement is corrected by performing rotation, and extension or shortening in accordance with the coordinate axis.

It is possible, instead of correcting the region itself, to correct the angle or length of the coordinate axis which serves as a reference in determining whether the region is a two-dimensional code or not and identifying information therefrom in the subsequent processing.

Furthermore, at step S126, the color component of the two-dimensional code in the new candidate region is corrected in order to enhance the color distinguishability in each cell.

Specifically, in a case where the original image data is color image data in which color is represented by a color space other than the CMYK, such as the RGB color space, each pixel value is converted into color image data in which color is represented by the CMYK color space. As a result, for example, the accuracy in recognizing a color (for example, green) that is difficult to recognize in the RGB color space can be improved in the subsequent color determination processing. In the present embodiment, a conversion table (color conversion look-up table (LUT)) for converting a value of a color space other than the CMYK (in the present embodiment, the RGB color space) into a value of the CMYK color space is stored in the storage device 70, and color conversion is performed using this color conversion LUT.

If correction is not required, the processing proceeds to step S128 without performing any of the processing above.

At step S128, it is determined whether a characteristic pattern as a two-dimensional code is included in a corresponding region corresponding to the candidate region corrected at step S126 above in the original image indicated by the image data acquired at step S102 above.

Here, the candidate region corrected at step S126 is scanned by unit region (a region formed of one or more dots). Subsequently, it is determined whether the pattern of the cells thus specified (in particular, the header region and the specifying cell) or the marks agrees with the cell arrangement pattern or the mark pattern defined in the "characteristic pattern" in the template read out at step S104 above. If the pattern does agree, it is determined that a characteristic pattern as a two-dimensional code is included in the code region. If the pattern does not agree, it is determined that a characteristic pattern as a two-dimensional code is not included in the code region.

In this determination processing, it is possible to apply an algorithm described later for the color determination processing to the determination on the color of each cell to specify the pattern of the cells.

The two-dimensional code 100 illustrated in FIG. 2 has a region specially provided separately from the data region, such as the header region and the specifying cell region. This region is extracted as a "characteristic pattern", on which the determination is made. However, the configuration is not limited thereto.

For example, the two-dimensional code shown in FIG. 2 may have another configuration so as to contain only a data region excluding the header region and the specifying cell region.

Also in this case, the arrangement pattern of plural kinds of cells or the mark pattern in the data region serves as a "characteristic pattern" in a similar manner as in the two-dimensional code 100. This pattern is compared with the characteristic pattern in the template to determine whether a "characteristic pattern" is included. However, each cell in the data region also plays a role of coding information and is not a dedicated cell as in the two-dimensional code 100.

In the determination, it is also possible to determine whether a characteristic pattern is included by calculation processing using information that is associated with the color given to a particular cell. Specifically, information is associated (for example, an error detection code) that can be used to confirm whether the arrangement pattern of cells or the color of the cell is a correct pattern or color, through calculation processing.

In this case, for example, the determination is made based on whether the numerical value of the calculation result is a numerical value indicating a correct pattern. Therefore, the characteristic pattern in the template may be set not only as a direct pattern but also as information such as a numerical value that indirectly indicates a correct pattern.

If it is determined at step S128 that a characteristic pattern as a two-dimensional code is not included (No), the processing proceeds to step S116, and similar processing as described above is thereafter performed for another code region.

If it is determined at step S128 that a characteristic pattern as a two-dimensional code is included (Yes), the processing proceeds to step S130.

When the processing proceeds to step S130, the new candidate region at this point of time is detected as a two-dimensional code region. The processing then proceeds to step S132.

This detection processing is processing of cutting out the new candidate region from the original image on the basis of the coordinate information of the new candidate region (creating a copy image) to store into the storage device 70.

At step S132, for the two-dimensional code region detected at step S130 above, color determination processing for specifying the color given to each cell in that two-dimensional code is performed. The processing then proceeds to step S134.

This color determination processing is executed with the two-dimensional code region detected at step S130 above as an argument, and the color given to each cell in the two-dimensional code serves as a return value. A specific processing procedure of this color determination processing will be described later.

At step S134, for the two-dimensional code region detected at step S130 above, information indicated by that two-dimensional code is identified based on the color given to each cell C and a combination thereof on the basis of the color specified at step S132 above. The processing then proceeds to step S136.

At step S136, the information identified at step S134 is stored into the RAM 62 or the storage device 70. The processing then proceeds to step S138.

At step S138, the variable X is incremented (X+1→X). The processing then proceeds to step S140.

As illustrated so far, the performing of steps S116 to S136 above means that the candidate region specified at step S110 has the appearance as a two-dimensional code. Therefore, at this step S138, the number of candidate regions detected and identified as two-dimensional code regions is summed up by incrementing the variable X.

At step S140, it is determined whether the variable X is equal to or greater than a particular number at this point of time. That is, it is determined whether the particular number of candidate regions or more have the appearance as a two-dimensional code.

If it is determined at step S140 that the variable X is equal to or greater than the particular number (Yes), the processing proceeds to step S140. If it is determined that the variable X is not equal to or greater than the particular number (No), the processing proceeds to step S142.

In other words, steps S116 to S140 above are repeatedly performed for all the code regions registered in the list as long as the number of candidate regions detected and identified as two-dimensional codes becomes not equal to or greater than a particular number.

After steps S116 to S140 above are performed for all the candidate regions, it is determined at step S116 that there are no unprocessed candidate regions. The processing then proceeds to step S142, and it is determined whether the value of the variable Y at this point of time is smaller than the value of a variable n (Y<n).

If it is determined at step S142 that the value of the variable Y is smaller than the value of the variable n (Yes), the processing proceeds to step S144.

When the processing proceeds to step S144, the variable Y is incremented (Y+1→Y). The processing then proceeds to step S108, and the processing at steps S108 to S144 above is performed.

Subsequently, the processing at step S110 to S144 above is performed based on the next edge image. If the variable X becomes equal to or greater than a particular number during the processing, the determination at step S140 above is "Yes," and the processing proceeds to step S146. If the variable X is not equal to or greater than a particular number during the processing, the processing for the next edge image is repeatedly performed.

Furthermore, if it is determined at step S142 that the value of the variable Y is equal to or greater than the value of the variable n (No), the processing proceeds to step S146 independently of the value of the variable X.

When the processing proceeds to step S146, the article detection processing of detecting a designated article in the original image is executed based on the information of the two-dimensional code identified. A series of processing then ends. A specific processing procedure of this article detection processing will be described later.

(3-2) Edge-Image Generation Processing

An example of the processing procedure of the edge-image generation processing at step S108 in FIG. 3 will now be described with reference to FIG. 5. FIG. 5A is a diagram showing an example of the correspondences between values of the variable Y, the kinds of image, and thresholds, and FIG. 5B is a flowchart showing an example of the processing procedure of the edge-image generation processing.

In the present embodiment, edge images are generated based on different kinds of conversion conditions.

Specifically, the first to i-th edge images corresponding to the first to i-th conversion conditions (1≦i) are images obtained by linearizing an outline portion of an image that is a binarized image of a gray scale image formed by gray-scaling the original image with different thresholds.

The (i+1)-th to (i+j)-th edge images (1≦j) corresponding to the (i+1)-th to (i+j)-th conversion conditions are images obtained by gray-scaling a color component image in j kinds of color components is extracted from the original image and by linearizing an outline portion of a binarized image formed by binarizing the gray scale image with preset thresholds.

When the color component image is binarized using k kinds (1≦k) of thresholds as preset thresholds, the (i+1)-th to (i+j×k)-th edge images corresponding to the (i+1)-th to (i+j×k)-th conversion conditions are images obtained by gray-scaling the color component image in j kinds of color components extracted from the original image and by linearizing the outline portion of the binarized image formed by binarizing the gray scale image with k kinds of thresholds.

Therefore, a maximum of "i+j×k" kinds of edge images can be generated based on "i+j×k" kinds of conversion conditions.

The values of "i" and "k" here are determined by the kind of threshold prepared in advance, and the value of "j" is determined by the number of color components defined by the kind of color space (color system) used in the original image. For example, if there are three kinds of thresholds and the color space is the RGB color space, the values of "i" and "k" are 3 and the value of "j" is 3.

Figures 5A, 5B:
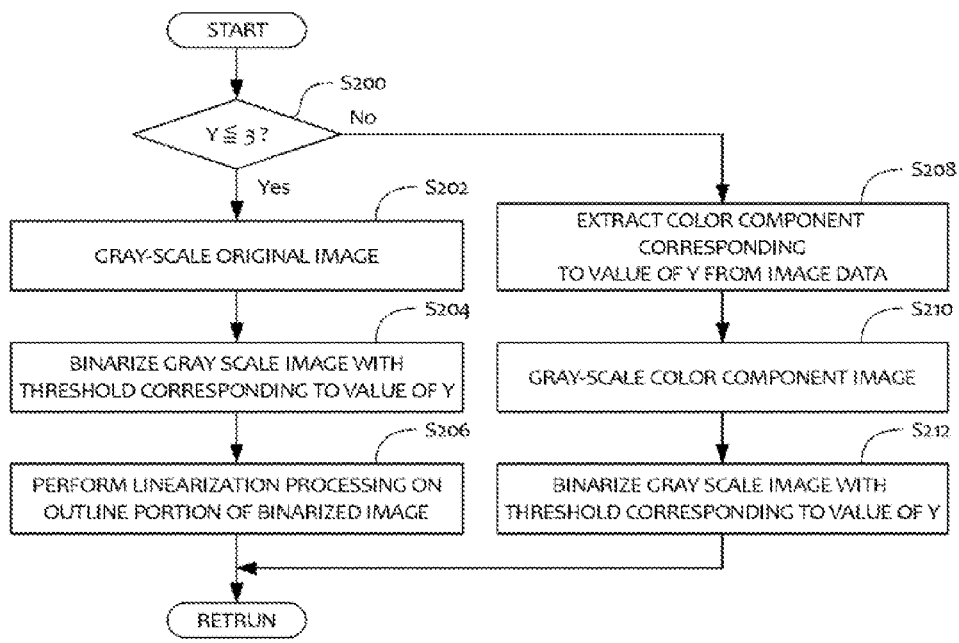
FIG. 5A is a diagram showing an example of correspondences between values of a variable Y, kinds of image, and thresholds.
FIG. 5B is a flowchart showing an example of a processing procedure of edge-image generation processing.

In the present embodiment, as shown in FIG. 5A, the numerical values 1 to 6 corresponding to the values of the variable Y are associated with the kinds of image and thresholds that are used when edge images are generated and indicate the kinds of conversion conditions, and are stored as a data table in the storage device 70. In the example in FIG. 5A, the value of "i" is 3, the value of "j" is 3, and the value of "k" is 1. Here, the upper limit value of the variable Y is determined by the value set in the variable n. In the present embodiment, the user can arbitrarily set the value corresponding to the accuracy in detecting the two-dimensional code as requested. In the example in FIG. 5A, the maximum value of the variable n is "6."

Upon the start of the edge-image generation processing, as shown in FIG. 5B, the processing proceeds to step S200 first, and it is determined whether the value of the variable Y is equal to or smaller than 3.

If it is determined at step S200 that the value of the variable Y is equal to or smaller than 3 (Yes), the processing proceeds to step S202. If it is determined that the value of the variable Y is greater than 3 (No), the processing proceeds to step S208.

When the processing proceeds to step S202, data of the original image obtained at step S102 in FIG. 3 as described above is duplicated, and a gray scale image is generated based on the original image data duplicated. The processing then proceeds to step S204.

Here, a gray scale image is generated from the data of the original image on the assumption that the data of the original image is color image data of eight bits (0 to 255) for each color of the RGB.

In a case where the number of pixels of the data of the original image is enormous (for example, 12 million of pixels), processing of converting the resolution to a lower resolution may be performed, although not essential, to such a degree that does not impair the detection accuracy, in consideration of the processing load and the processing time.

The method of generating a gray scale image includes a middle value method, a mean method, and other well-known generation methods.

The middle value method is a method of gray-scaling by adding two values, namely, the maximum value and the minimum value of the values of three color components of R, G, and B and then dividing the resultant value by two.

The mean method includes the arithmetic mean method, the geometric mean method, the weighted mean method, etc., depending on how to average.

The arithmetic mean method is a method of gray-scaling using a mean value calculated by arithmetically averaging the values of three color components R, G, and B (dividing the sum by three).

The geometric mean method is a method of gray-scaling using a mean value calculated by geometrically averaging the values of three color components R, G, and B (arithmetically averaging logarithm values of values of the color components).

The weighted mean method is a method of gray-scaling by dividing the weighted values of three color components R, G, and B by three and obtaining the average. The weighted mean method mainly includes the NTSC weighted mean method and the HDTV weighted mean method, depending on the coefficient of weighting. The NTSC weighted mean method is the same as a method of separating a luminance signal (brightness) used in Japanese or American television broadcasting. The HDTV weighted mean method is a method in which a weight coefficient is set based on the HDTV standard, which is referred to when the high definition television broadcast is displayed.

It is preferable to use an appropriate method of generating a gray scale image in consideration of the processing speed (processing time), the detection accuracy, or other conditions.

When any one of the methods described above is used, the one luminance value calculated is set as the value of three color components R, G, and B (R=G=B).

Here has been described an example in which a gray scale image is generated by converting the values of R, G, and B color components into luminance values. However, a gray scale image may be generated not by using luminance but by using lightness, for example.

Gray scale image data is generated in this manner by converting each pixel value of original image data into a gray scale value.

At step S204, binarized image data is generated by binarizing the gray scale image data generated at step S202 with a threshold corresponding to the value of the variable Y at the present time. The processing then proceeds to step S206.

Specifically, when the pixel value of each color of the gray scale image data is represented by an eight-bit gray scale value, each pixel value of the gray scale image is compared with a threshold. The binarization is performed by converting the pixel value into "0" when the pixel value is equal to or smaller than the threshold, and by converting the pixel value into "255" when the pixel value is greater than the threshold.

Here, as shown in FIG. 5A, three kinds of thresholds, namely, 120, 150, and 200 are prepared for the values 1, 2, and 3 of the variable Y. The thresholds for binarization are defined as values suitable for extracting a valid candidate region and appropriately identifying a two-dimensional code in the subsequent processing, in accordance with the "region rule" and "characteristic pattern" of a two-dimensional code.

Therefore, when the value of the variable Y is 1, the gray scale image generated at step S202 above is binarized using the threshold 120. When the value of the variable Y is 2 or 3, the gray scale image generated at step S202 above is binarized with the threshold 150 or 120, respectively.

For example, in a case where a pixel value in a gray scale image is (80, 80, 80) when the threshold is 120, the value after binarization will be (0, 0, 0) corresponding to black. In a case where a pixel value in a gray scale image is (160, 160, 160) when the threshold is 120, the value after binarization will be (255, 255, 255) corresponding to white.

In this manner, the binarized pixel values of the gray scale image data generated at step S202 above form the binarized image data corresponding to the original image data.

At step S206, edge image data is generated from the binarized image data by linearizing the outline portion in the binarized image. A series of processing then ends, and the processing returns to the original processing.

In the present embodiment, the outline portion of the object existing in the binarized image is linearized by the Bresenham's line algorithm, which is publicly known. In the present embodiment, unnecessary pixels that do not form the outline after linearization are removed (for example, the pixel value is converted into (0, 0, 0)).

Here, the Bresenham's line algorithm can perform the entire operation only with integer arithmetic without using divisions or other operations, thereby enabling fast line drawing.

In this manner, data of the image with the linearized outline portion in the binarized image serves as edge image data.

When the value of the variable Y is greater than 3 at step S200 and the processing proceeds to step S208, the color component corresponding to the value of the variable Y is extracted from data of the original image. The processing then proceeds to step S210.

Here, as shown in FIG. 5A, the color components of red, green, and blue are extracted for the values 4, 5, and 6, respectively, of the variable Y.

For example, if the value of the variable Y is 4 and a certain pixel value of the original image data is (120, 80, 45), a red component value (120, 0, 0) is extracted. Similarly, if the value of the variable Y is 5, a green component value (0, 80, 0) is extracted. If the value of the variable Y is 6, a blue component value (0, 0, 45) is extracted.

In this manner, the image data obtained by extracting the value of each color component serves as red component image data, green component image data, and blue component image data.

At step S210, gray scale image data is generated from the color component image data generated at step S208. The processing then proceeds to step S212.

Gray scale image data is generated through similar processing as at step S202 above.

At step S212, binarized image data is generated by performing binarization on the gray scale image generated at step S210 with a preset threshold. The processing then proceeds to step S206.

Here, as shown in FIG. 5A, a common threshold 120 is prepared for values 4, 5, 6 of the variable Y.

Therefore, binarized image data for the color component image data generated at step S208 is generated by performing binarization on the gray scale image data generated at step S210 above with the threshold 120.

After the binarized image data is generated at step S212, the processing proceeds to step S206, and edge image data is generated by linearizing the outline portion of the object in the binarized image. A series of processing then ends, and the processing returns to the original processing.

In the example shown in FIG. 5A, a single kind of threshold is used in the binarization of a gray scale image corresponding to a color component image. However, the configuration is not limited thereto. The seventh and subsequent conversion conditions may be set so that binarization is performed using various kinds of thresholds.

In the example shown in FIG. 5A, binarization is performed on the gray scale image corresponding to the original image, by using thresholds in increasing order, and an edge image is generated from the binarized image. Subsequently, after the processing of generating an edge image using the gray scale image corresponding to the original image, the processing of generating an edge image by binarizing the gray scale image corresponding to the color component image is performed in order of the color component images of red, green, and blue. However, the configuration is not limited thereto.

For example, the thresholds to be used in the binarization of the gray scale image corresponding to the original image may be used in a different order. The binarization of the gray scale image corresponding to the color component image may be performed in a different order of colors.

The processing of generating an edge image using the color component image and the processing of generating an edge image using the original image may be performed in a different order. For example, the processing of generating an edge image using the color component image may be performed prior to the processing of generating using the original image. The two kinds of processing of generating an edge image using the original image and the color component image may be performed alternately or performed at random.

In a case where the binarization of the gray scale image corresponding to the color component image is performed using various kinds of thresholds, the thresholds are not limited to being used in increasing order and may be used in a different order. Furthermore, the value of the threshold used in the binarization of the gray scale image corresponding to the color component image may be the same value as the threshold used in the binarization of the gray scale image corresponding to the original image, or may be a different value.

In the example shown in FIG. 5A, there are three kinds of thresholds for the original image, is a single kind of threshold for the color component image, and are three kinds of color component images. However, the combination is not limited to this, and a combination of different kinds may be employed.

In the example shown in FIG. 5A, an edge image is generated using both the original image and the color component image. However, the configuration is not limited thereto, and a different configuration may be employed. For example, an edge image may be generated only using the original image, or an edge image may be generated only using the color component image.

In the example shown in FIG. 5A, thresholds "120," "150," and "200" are used as three kinds of thresholds for binarizing the gray scale image corresponding to the original image. However, the thresholds are not limited thereto, and different values may be used. Similarly, in the example shown in FIG. 5A, a threshold "120" is used as a threshold for binarizing the gray scale image corresponding to the color component image. However, the threshold is not limited thereto, and a different value may be used.

(3-3) Valid-Region Determination Processing

A processing procedure of the valid-region determination processing at step S120 in FIG. 3 will now be described with reference to FIG. 6 and FIG. 7.

Figure 6:
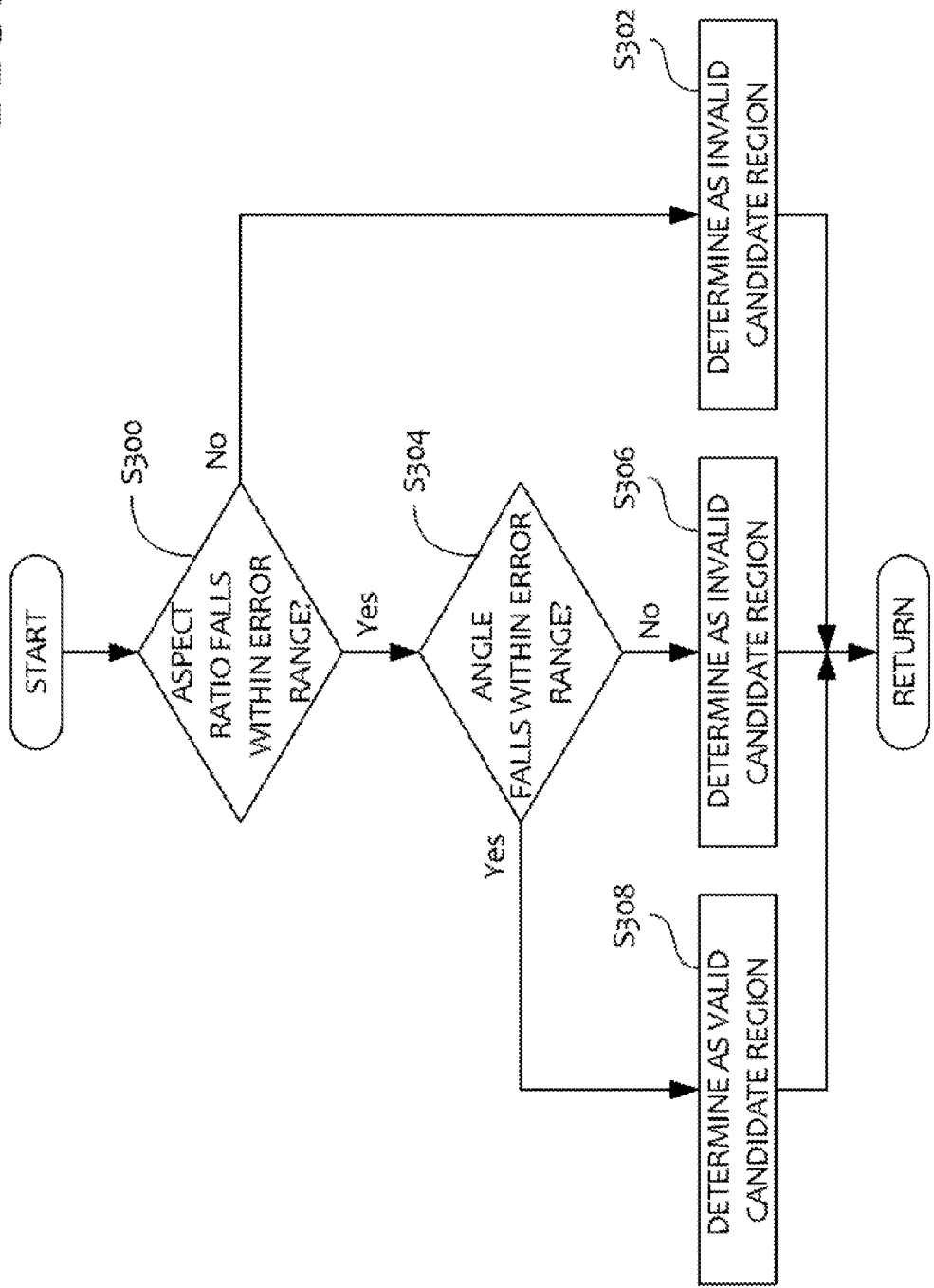
FIG. 6 is a flowchart showing a processing procedure of valid-region determination processing.
Figure 7A:
FIG. 7A is a diagram showing an example of a shape of an ideal candidate region.

Here, FIG. 6 is a flowchart showing the processing procedure of the valid-region determination processing. FIG. 7A is a diagram showing an example of a shape of an ideal candidate region, FIGS. 7B to 7E are diagrams showing examples of a shape outside the error range, and FIGS. 7F to 7G are diagrams showing examples of a shape within the error range.

The aspect ratio of the candidate region is preferably the ratio between the length A of the short side and the length B of the long side of the ideal region shape (A:B=A/B) as shown in FIG. 7A. In addition, preferably, the angles between each side (four corners) of the candidate region are ideally 90° as shown in FIG. 7A.

In the processing of specifying a candidate region at step S110 above, however, any closed region having a rectangular shape (rectangular region) is specified as a candidate region. Consequently, candidate regions having various outer shapes are specified. Furthermore, even when the candidate region specified is that of a two-dimensional code, the shape may not be ideal due to the shooting conditions (for example, the shooting angle) or the image quality of the shot image. Consequently, if the determination is made strictly, even a region corresponding to a two-dimensional code region is eliminated. Thus, in the present embodiment, an error range is set in information defined by the region rule, such as the aspect ratio or angle, in the determination.

In an example described here, whether a candidate region is a valid region or not is determined from the aspect ratio and the angle between two adjacent sides, in consideration of the two-dimensional code region having a rectangular shape as shown in FIG. 2, and the processing load.

Upon the start of the valid-region determination processing, as shown in FIG. 6, the processing proceeds to step S300 first, and it is determined whether the aspect ratio of the candidate region selected falls within the error range of the aspect ratio defined in the region rule of the template.

Figure 7B:
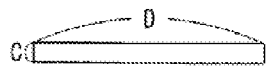
FIGS. 7B to 7E are diagrams showing examples of a shape outside an error range.
Figure 7C:
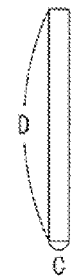
Figure 7D:
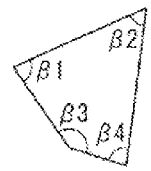
Figure 7E:
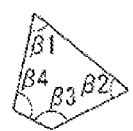
Figure 7F:
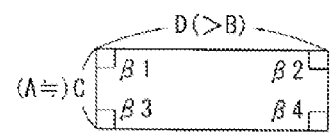
FIGS. 7F to 7G are diagrams showing examples of a shape within the error range.
Figure 7G:
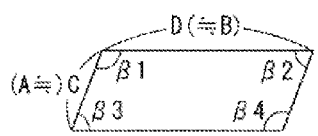

For example, when the length of the short side is C and the length of the long side is D as in the candidate region shown in FIGS. 7B, 7C, and 7F, the aspect ratio is "C:D=C/D", and thus an error dr from the ideal shape will be "dr=A/B−C/D". The error range is then set as "from −dx to +dx". It is determined in the present embodiment that the aspect ratio falls within the error range if dr falls within "from −dx to +dx". It is determined that the aspect ratio falls outside the error range if dr falls outside "from −dx to +dx".

If it is determined at step S300 that the aspect ratio of the candidate region falls outside the error range (No), the processing proceeds to step S302. If it is determined that the aspect ratio of the candidate region falls within the error range (Yes), the processing proceeds to step S304.

When the processing proceeds to step S302, it is determined that the candidate region having been determined to fall outside the error range is an invalid candidate region, and a series of processing ends (with the determination result as a return value). The processing then returns to the original processing.

This enables the excluding of the shapes having an aspect ratio extremely different from the ideal aspect ratio A:B as shown in, for example, FIGS. 7B and 7C, thereby preventing such regions from being subjected to the subsequent processing (the processing after step S124 in FIG. 3).

When it is determined that the aspect ratio falls within the error range and the processing proceeds to step S304, it is determined whether the angle formed between each side of the candidate region falls within the error range for the angle defined in the region rule of the template.

For example, let the angles between each side (four corners) be $\beta 1$ to $\beta 4$, as shown in FIGS. 7D to 7F. The errors $d\beta 1$ to $d\beta 34$ from the angle of the ideal shape are obtained by subtracting each of the angles $\beta 1$ to $\beta 4$ from the angle 90° of the ideal shape, that is, "$d\beta 1$ to $d\beta 4=90°-\beta 1$ to $90°-\beta 4$". The error range is then set as "from −dy to +dy". If $d\beta 1$ to $d\beta 4$ all fall within the range set as "from −dy to +dy", it is determined in the present embodiment that the angle falls within the error range. If even any one of $d\beta 1$ to $d\beta 4$ falls outside the range of "from −dy to +dy", it is determined that the angle falls outside the error range.

If it is determined at step S304 that the angle between each side of the candidate region falls outside the error range (No), the processing proceeds to step S306. If it is determined that the angle between each side of the candidate region falls within the error range (Yes), the processing proceeds to step S308.

When the processing proceeds to step S306, it is determined that the candidate region having been determined to fall outside the error range is an invalid candidate region, and a series of processing ends (with the determination result as a return value). The processing then returns to the original processing.

This enables the excluding of the shapes in which at least one of the angles $\beta 1$ to $\beta 4$ falls outside the error range when compared with the ideal angle as shown in, for example, FIGS. 7D and 7E, thereby preventing such regions being subjected to the subsequent processing (the processing after step S124 in FIG. 3).

When it is determined that the angle falls within the error range and the processing proceeds to step S308, it is determined that the candidate region having been determined to fall within the error range is a valid candidate region, and a series of processing ends (with the determination result as a return value). The processing then returns to the original processing.

For example, when the errors $d\beta 1$ to $d\beta 4$ of the angles $\beta 1$ to $\beta 4$ all fall within the error range (in this example, all of them are 90°) and only the aspect ratio differs to such a degree that the error dr of the aspect ratio falls within the range of "from "–dx to +dx", as in the candidate region shown in FIG. 7F, this candidate region is not excluded but determined as a valid candidate region.

Similarly, even when the angles β1 to β4 are not 90° and all of them are skewed although the error dr of the aspect ratio falls within the range of "from –dx to +dx", if the errors dβ1 to dβ4 of the angles β1 to β4 are all fall within the error range of "from –dy to +dy", as in the candidate region shown in FIG. 7G, this candidate region is not excluded but determined as a valid candidate region.

In short, in the present embodiment, only the candidate region whose aspect ratio and angle both fall within the respective error ranges is determined as a valid candidate region.

(3-4) Color Determination Processing

A processing procedure of the color determination processing at step S132 in FIG. 3 will now be described with reference to FIG. 8.

Figure 8:
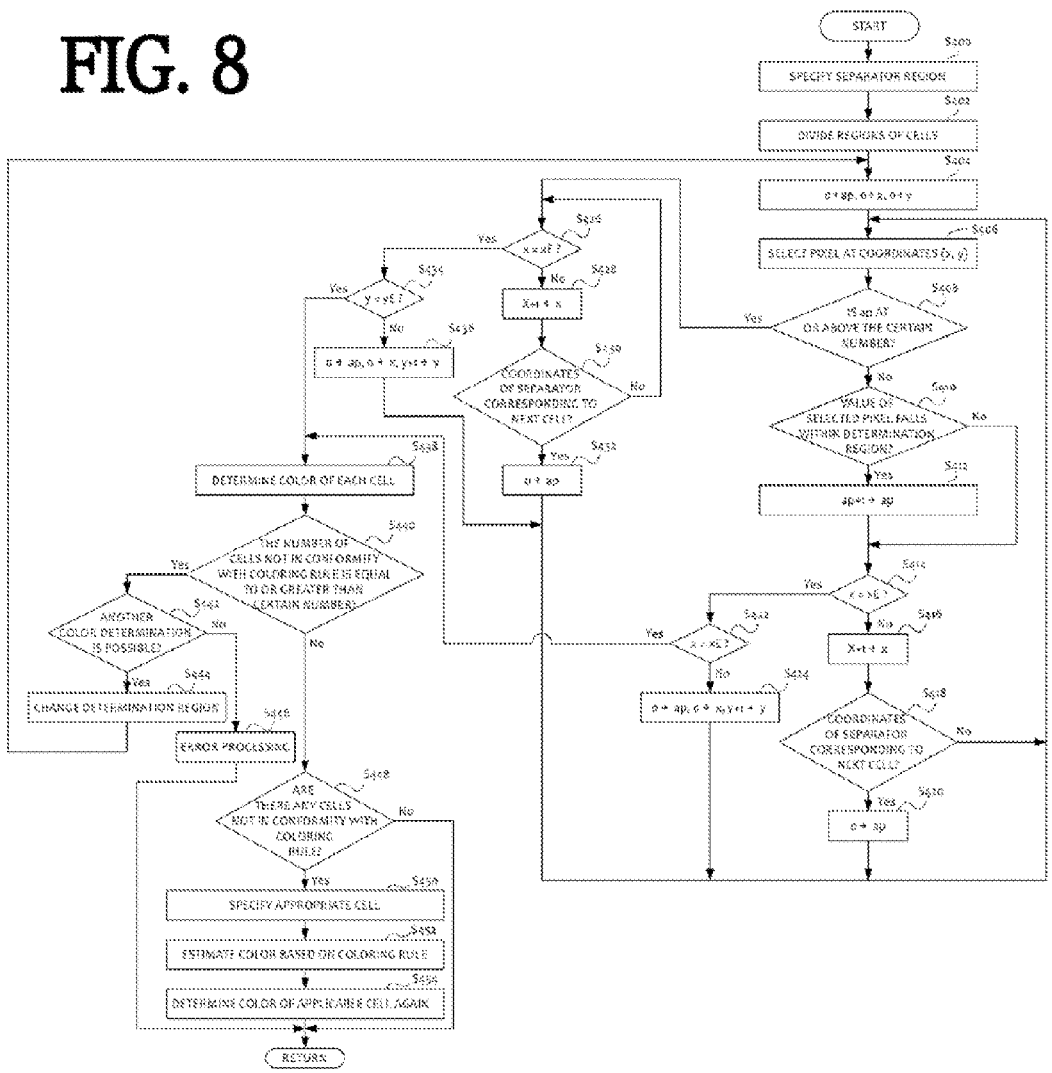
FIG. 8 is a flowchart showing an example of a processing procedure of color determination processing.

Here, FIG. 8 is a flowchart showing an example of the processing procedure of the color determination processing.

Upon the start of the color determination processing, as shown in FIG. 8, the processing proceeds to step S400 first, and the region of the separator 110 in the two-dimensional code region detected at step S130 in FIG. 3 is specified (the coordinates thereof are specified). The processing then proceeds to step S402.

The two-dimensional code region detected is managed, for example, with the coordinates of the upper-left pixel as (0, 0) in the shape position in FIG. 2. Furthermore, for specifying the separator 110, the pixels are scanned (raster-scan) from the coordinates (0, 0) in the row direction and the column direction. It is then determined whether the value (color) of each pixel is included in the determination region of the color (in the present embodiment, black (k) used for the specifying cell) of the separator 110. If it is determined that the color of the pixel is included in the determination region, that pixel (coordinates) is determined as the separator 110. This coordinate information is then stored into the RAM 62 or the storage device 70.

For the two-dimensional code 100 having a configuration illustrated in FIG. 2, a characteristic pattern has already been identified from the candidate region at step S128 in FIG. 3 described above. Therefore, the color determination processing may be performed only for the remaining portion from which the identified regions (for example, the header region and the region including the specifying cells) are removed.

At step S402, the regions having the cells are divided based on the coordinate information of the separator 110. The processing then proceeds to step S404.

Specifically, the coordinates of a region in which black (k) pixels equal to or greater than a particular number exist continuously or a region whose periphery (four sides) are surrounded by the separator 110 are set as coordinates of each cell to store the coordinate information thereof into the RAM 62 or the storage device 70.

At step S404, the variables referred to in the subsequent processing are initialized (0→ap, 0→x, 0→y). The processing then proceeds to step S406.

At step S406, a pixel having coordinates (x, y) in the two-dimensional code region having the separator 110 specified is selected. The processing then proceeds to step S408.

At step S408, it is determined whether the value of the variable ap is equal to or greater than a predetermined certain number. If it is determined that the value is not equal to or greater than the certain number (No), the processing proceeds to step S410. If it is determined that the value is equal to or greater than the certain number (Yes), the processing proceeds to step S422.

When the processing proceeds to step S410, it is determined whether the value (color) of the pixel selected is included in any one of the determination regions (positioned in any one of the determination regions) in the color space extending with a plurality of colors used in the two-dimensional code as center coordinates.

If it is determined at step S410 that the pixel selected is included in any one of the determination regions (Yes), the processing proceeds to step S412. If it is determined that the selected pixel is not included in any determination region (No), the processing proceeds to step S414.

When the processing proceeds to step S412, the variable ap is incremented (ap+1→ap). The processing then proceeds to step S414.

Here, the number of pixels determined to be included in a determination region is counted by incrementing the variable ap. This determination result (including information of the determination region and the count result) is associated with each cell to be stored into the RAM 62 or the storage device 70.

Here, it is preferable that the number of pixels included in a determination region of the same color be counted with the variable ap. However, when pixels included in determination regions of different colors exist in the region of each cell, these pixels are counted in the processing at step S412 above without being distinguished from each other. Specifically, the variable ap is incremented regardless of whether the pixel is determined as yellow or magenta in the region of the same cell. Therefore, on the assumption that there exist pixels included in the determination regions of different colors, the number of pixels included in each region may be counted using a different variable, and the processing at step S412 above may be replaced with processing of setting as the variable ap the largest number of pixels in a determination region at the present time.

The processing thereafter proceeds to step S414, and it is determined whether the value of the variable x is xE, which is the x coordinate at the rightmost end in that row.

Even when it is determined that the pixel selected is not included in any determination region, the processing proceeds to step S414, and it is determined whether the value of the variable x is xE.

If it is determined that the value of the variable x is not xE (No), the processing proceeds to step S416. If it is determined that the value of the variable x is xE (Yes), the processing proceeds to step S422.

When the processing proceeds to step S416, the variable x is incremented (x+1→x). The processing then proceeds to step S418.

In other words, when the value of the variable x is not xE, the variable x is incremented whereby the coordinate is changed to the pixel to the immediate right.

At step S418, it is determined whether the coordinates (x, y) at the present time are the starting coordinates of the separator portion corresponding to the next cell. If it is determined that the coordinates at the present time are the starting coordinates of the next separator (Yes), the processing proceeds to step S420. If not (No), the processing proceeds to step S406.

When the processing proceeds to step S420, the variable ap is initialized (0→ap). The processing then proceeds to step S406.

In other words, the variable ap is initialized when the x coordinate reaches the starting x coordinate of the separator corresponding to the next cell while the number of pixels of the color included in the color determination region does not reach the certain number or more.

When it is determined at step S414 that the value of the variable x is xE and the processing proceeds to step S422, it is determined whether the value of the variable y is yE, which is the y coordinate at the lowermost end in the column direction.

If it is determined that the value of the variable y is not yE (No), the processing proceeds to step S424. If it is determined that the value of the variable y is yE (Yes), the processing proceeds to step S438.

When the processing proceeds to step S424, the variable ap and the variable x are initialized (0→ap, 0→x), and the variable y is incremented (y+1→y). The processing then proceeds to step S406.

In other words, the coordinates are changed to the pixel in the column immediately below and at the leftmost end by initializing the variable x and incrementing the variable y. Here, the variable ap is also initialized because the coordinates (x, y) becomes coordinates of the region corresponding to the next cell.

When it is determined at step S408 that the value of the variable ap is not equal to or greater than the certain number and the processing proceeds to step S426, it is determined whether the value of the variable x is xE.

If it is determined that the value of the variable x is not xE (No), the processing proceeds to step S428. If it is determined that the value of the variable x is xE (Yes), the processing proceeds to step S432.

When the processing proceeds to step S428, the variable x is incremented (x+1→x), and the processing proceeds to step S430.

At step S430, it is determined whether the coordinates (x, y) at the present time are the starting coordinates of the separator corresponding to the next cell. If it is determined that the coordinates at the present time are the starting coordinates of the next separator (Yes), the processing proceeds to step S432. If not (No), the processing proceeds to step S426.

When the processing proceeds to step S432, the variable ap is initialized (0→ap). The processing then proceeds to step S406.

In other words, when the variable ap is equal to or greater than a certain number, the processing at steps S426 to S430 above is repeatedly performed, whereby the color determination processing at step S410 above is omitted for the remaining pixels in that row in the region corresponding to each cell C.

Here, a certain number, which is compared with the variable ap at step S408 above, is a value that is preset in consideration of the color determination accuracy, and is value less than the number of pixels in each cell C in each row. Therefore, when a certain number of color determinations that is sufficient for color determination in each row are made, the color determination processing for the remaining pixels is omitted accordingly.

Specifically, for example, if a certain number is 10, it is determined that the value of the variable ap is equal to or greater than the certain number at step S408 when the pixels determined to be included in the determination region of yellow as center coordinates reaches 10 pixels (ap=10) in any given row in a cell region. The color determination processing at step S410 above is then omitted for the remaining pixels in the same row of the appropriate cell C.

When it is determined at step S426 that the value of the variable x is xE and the processing proceeds to step S434, it is determined whether the value of the variable y at the present time is yE, which is the y coordinate at the lowermost end in the column direction.

If it is determined at step S434 that the value of the variable y is not yE (No), the processing proceeds to step S436. If it is determined that the value of the variable y is yE (Yes), the processing proceeds to step S438.

When the processing proceeds to step S436, the variable ap and the variable x are initialized (0→ap, 0→x), and the variable y is incremented (y+1→1). The processing then proceeds to step S406.

When the color determination is finished for all the pixels in the two-dimensional code region and the processing proceeds to step S438, the color of each cell C is determined based on the color determination results of the pixels in each row in the region of each cell C that are stored in the RAM 62 or the storage device 70. The processing then proceeds to step S440.

Specifically, when the number of rows in which the number of pixels included in a determination region reaches a certain number or more is equal to or greater than a particular number for the region of each cell C, the color of each cell C is determined to be the color of the center coordinates of the determination region. Subsequently, each cell C and the color determined are associated with each other to be registered in the data table in the RAM 62 or the storage device 70. Here, if color is determined for the cell C already registered in the data table, the color corresponding to this cell C is updated with the latest color determined in this manner. If it is determined that the number of rows in which the number of pixels included in a determination region reaches a certain number or more is less than the particular number, and when the cell C is not included in any of the determination regions of a plurality of colors used in the two-dimensional code, the appropriate cell C is associated with that the color is outside the determination region.

At step S440, it is determined whether there exist a certain number of cells C or more given a color not in conformity with the coloring rule among the cells C on which color determinations are performed at step S438.

Here, when the cells associated with the color outside the determination region exist in a particular proportion or more (for example, 30% of all) in the data table in which the cells C and colors are registered in association with each other, it is determined that the cells C given a color not in conformity with the coloring rule exist in a particular proportion or more.

Here, it is determined whether a certain number cells or more given a color not in conformity with the coloring rule exist, on the basis of a relative number (that is, a proportion) with respect to the cells C of the two-dimensional code. However, the determination may be made based on the absolute number with respect to the cells C of the two-dimensional code. In a case where cells not in conformity with the coloring rule are arranged in a particular pattern (for example, two or more such cells C are arranged continuously), the determination may be made based on the number of such patterns.

If it is determined at step S440 that a certain number of cells C or more given a color not in conformity with the coloring rule exist (Yes), the processing proceeds to step S442.

When the processing proceeds to step S442, it is determined whether another color determination is possible with the determination region being changed.

Here, it is determined that a color determination is not possible again when the determination region referred to in the color determination at step S410 is changed up to a predetermined upper limit.

This "predetermined upper limit" is defined as a range in which each determination region can be changed so as not to interfere with other determination regions. In a case where the determination region is simply expanded as described later, "changed up to a predetermined upper limit" is determined when each determination region is expanded to a degree that interferes with other regions. In a case where the determination region is shifted, "changed up to a predetermined upper limit" is determined when the color defined by the determination region shifts to the position (boundary) immediately before a different color component.

If it is determined at this step S442 that another color determination is possible (Yes), the processing proceeds to step S444. If not (No), the processing proceeds to step S446.

When the processing proceeds to step S444, the determination region referred to in the color determination at step S410 above is changed. The processing then proceeds to step S404. Here, the determination region is changed by expanding each determination region by a certain region in the color space or by shifting each color determination region by a certain distance in the color space.

In the latter case, the determination region can be shifted to a position in the color space so that a deviation of a color component can be canceled in the image region of the two-dimensional code. Specifically, the color distribution in the image region of the two-dimensional code is referred to. If a particular color component is larger as a whole in the distribution, each determination region is shifted in the direction so that this color component is reduced.

After step S444 is finished in this manner, the processing proceeds to step S404. Color determination processing is then performed again for a region of each cell C divided at step S402.

Subsequently, changing the determination region and color determination are repeated (steps S404 to S444) until it is determined a certain number of cells C or more not given a color in conformity with the coloring rule do not exist in the cells C on which color determinations are performed again (the branch to "No" at step S440).

If it is determined at step S442 that another color determination is impossible and the processing proceeds to step S446, error processing is performed, and a series of processing ends. The processing then returns to the original processing.

In this error processing, on the assumption that the determination cannot be made for the color in any cell C, all the correspondences registered in the data table are erased. Thus, the processing proceeds to the original processing with an empty data table as a return value. In this case, in the code-using product detection processing in FIG. 3, no processing is performed at steps S134 or S136, and the processing after S138 is performed.

The processing proceeds to step S448 if it is determined at step S440 above that, during the processing at steps S438 to S444 above, there do not exist a certain number of cells C or more given a color not in conformity with the coloring rule (No).

When the processing proceeds to step S448, it is determined whether there exists a cell C given a color not in conformity with the coloring rule.

If it is determined at step S448 that an appropriate cell C exists (Yes), the processing proceeds to step S450. If no appropriate cell C exists (No), a series of processing ends, and the processing returns to the original processing.

When the processing proceeds to step S450, an appropriate cell C is specified from the two-dimensional code. The processing then proceeds to step S452.

Here, a cell C given a color not in conformity with the coloring rule is specified from among the cells C registered in the data table at this point of time, and this cell C is specified from the two-dimensional code.

At step S452, a color that should be given in conformity with the coloring rule is estimated for each cell C specified at step S448 above. The processing then proceeds to step S454.

Here, for the cell C specified at step S448 above, colors possible in relation to the color given to the cell adjacent to that cell C are selected as candidates of the color that should be given in conformity with the coloring rule. The most probable color among those candidates is estimated as the color to be given to the cell C.

At step S454, for each cell C specified at step S448 above, it is determined that the color of the cell C is the color estimated at step S452 above. A series of processing ends, and the processing returns to the original processing.

Here, the color in the data table is updated only for each cell C specified at step S448 above.

In this case and in the case where no appropriate cell C is specified at step S448, the processing returns to the code-using product detection processing in FIG. 3 with the data table in which the correspondences between cells C and colors are registered at this point of time, as a return value. In this case, in the code-using product detection processing, the information identification at step S134 is performed after the color given to each cell C is recognized based on the data table.

The algorithm illustrated at steps S400 to S454 above or the algorithm illustrated at steps S400 to S438 above can be applied when the processing of determining whether a characteristic pattern is included is performed at step S128 in FIG. 1 as described above.

In the configuration of a two-dimensional code only having a data region, the following configuration may be applied: the color determination processing at steps S400 to S438 above or the color determination processing at steps S400 to S454 above may be preliminarily performed before the processing at step S128 is performed; and the processing of determining whether a characteristic pattern is included may be performed based on the determination result. For example, the color determination processing (S132) is performed following the processing at step S126 in FIG. 1 described above. At step S128, the determination whether a characteristic pattern is included is made based on the result of the color determination processing previously performed. In this case, the subsequent color determination processing becomes unnecessary.

(3-5) Article Detection Processing

A processing procedure of the article detection processing at step S146 in FIG. 3 will now be described with reference to FIG. 9 to FIG. 12 with a specific example.

Figure 9:
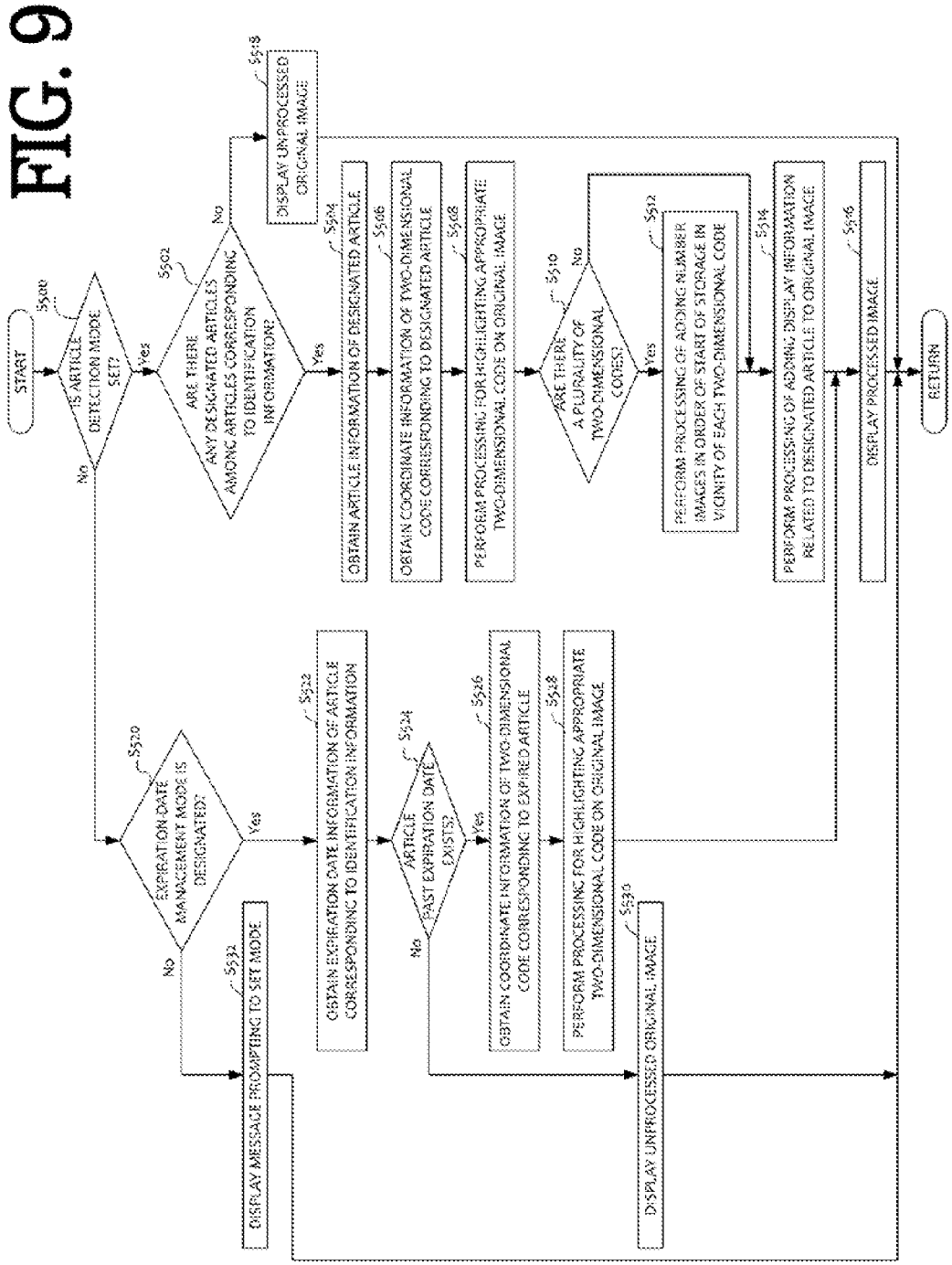
FIG. 9 is a flowchart showing an example of a processing procedure of article detection processing.
Figure 11A:
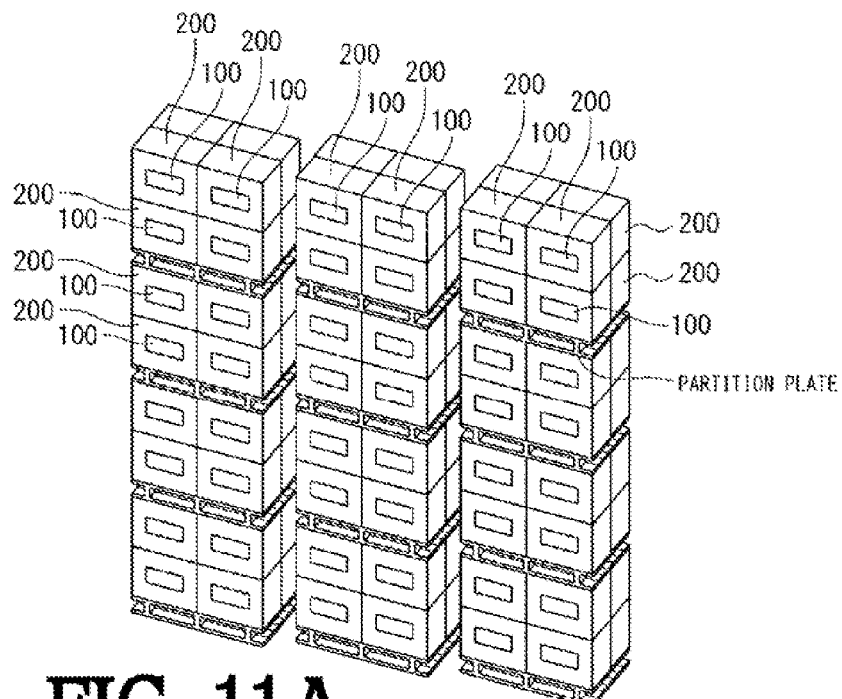
FIG. 11A is a diagram showing an example of a detection target image in an article detection mode.
Figure 11B:
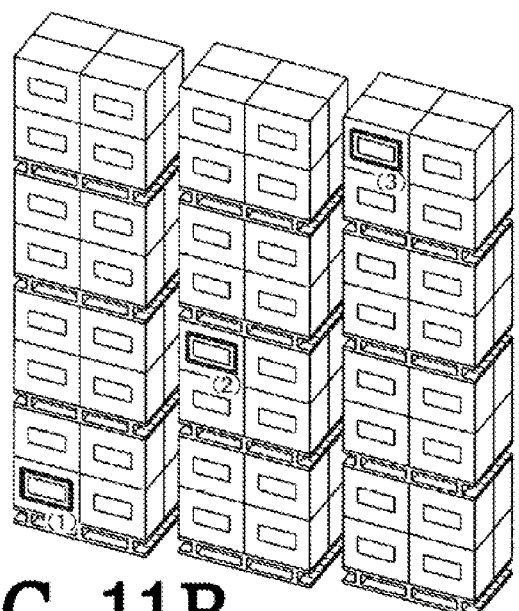
FIG. 11B is a diagram showing a display example of a detection result.
Figure 12A:
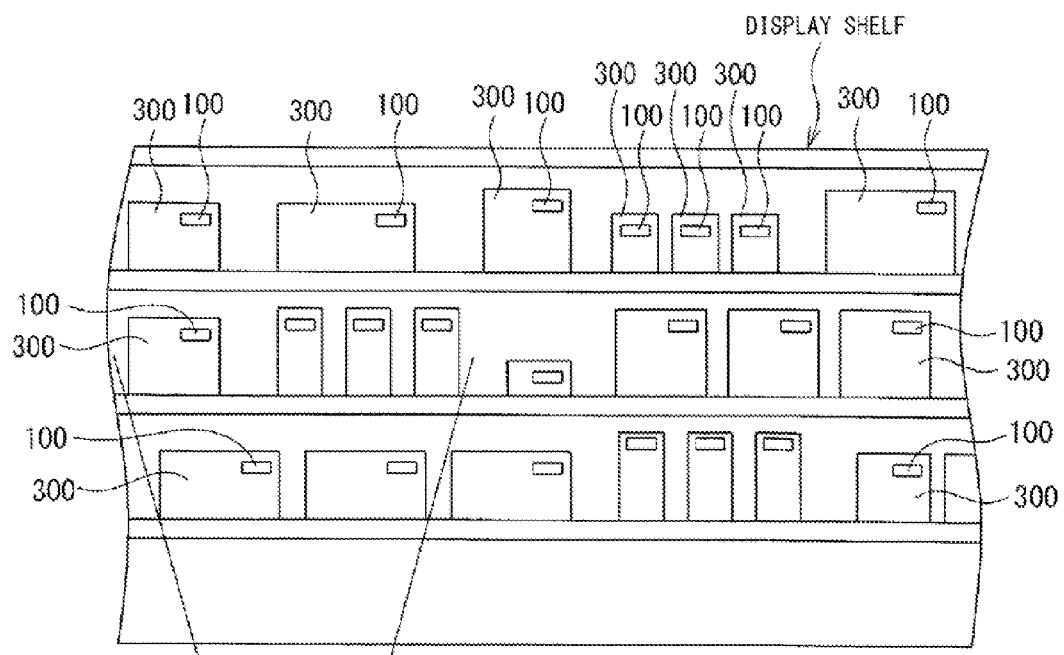
FIG. 12A is a diagram showing an example of a detection target image in an expiration-date management mode.
Figure 12B:
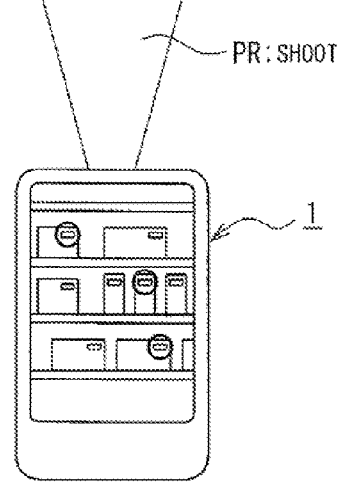
FIG. 12B is a diagram showing a display example of a detection result.
Figure 12C:
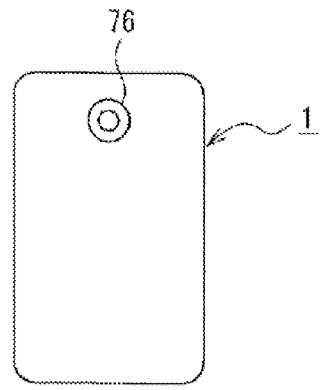
FIG. 12C is a diagram showing an example of an installation location of a camera 76.

Here, FIG. 9 is a flowchart showing an example of the processing procedure of the article detection processing. FIG. 10 is a diagram showing an example of identification information and article information registered in a database. FIG. 11A is a diagram showing an example of a detection target image in the article detection mode, and FIG. 11B is a diagram showing a display example of a detection result. FIG. 12A is a diagram showing an example of a detection target image in the expiration-date management mode, FIG. 12B is a diagram showing a display example of a detection result, and FIG. 12C is a diagram showing an example of an installation location of the camera 76.

Upon the start of the article detection processing, as shown in FIG. 9, first, the processing proceeds to step S500, where it is determined whether the detection mode being set is the article detection mode.

If it is determined that the detection mode being set is the article detection mode (Yes), information of the article (hereinafter referred to as the designated article) designated as a detection target is acquired, and the processing proceeds to step S502. If it is determined that the detection mode is not the article detection mode (No), the processing proceeds to step S520.

When the processing proceeds to step S502, it is determined whether the designated article exists among the articles that correspond to the article information corresponding to the identification information of two-dimensional codes stored in the RAM 62 or the storage device 70, based on the article information stored in the storage device 70.

Here, as shown in FIG. 10, item codes, kinds of items, the number of pieces, the storage start time, the shipment deadline, and the use-by date, for example, are registered as the article information in association with the identification information identified at step S134 in FIG. 3.

In the present embodiment, one two-dimensional code is provided for each packaging material such as cardboard in which an article is packaged. The item code is given to one or more articles packaged in a package. The number-of-pieces information is therefore information of the number of articles packaged in one package.

As the storage start date, for example, information of the date of warehousing is registered if articles are managed in a warehouse. Information of the date of display or information of the date of manufacture of the articles is registered if articles are foods displayed on shelves in a store. Information of the use-by date (best-before date) is registered in the case of articles that degrade over time, such as foods or chemicals. Information of the shipment (storage) deadline is registered if the articles stored in a warehouse have a shipment (storage) deadline.

Therefore, the determination as to whether the designated article exists is performed by determining whether the identification information corresponding to the item code designated exists in the identification information identified at step S134 in FIG. 3 described above.

At step S502, if it is determined that the designated article exists, the processing proceeds to step S504. If it is determined that the designated article does not exist (No), the processing proceeds to step S518.

When it is determined that the designated article exists and the processing proceeds to step S504, information of the designated article is acquired from the article information in the storage device 70. The processing then proceeds to step S506.

At step S506, the image data of the original image and the coordinate information in the original image of the two-dimensional code corresponding to the identification information of the designated article are acquired from the RAM 62 or the storage device 70. The processing then proceeds to step S508.

Here, it is assumed that, as shown in FIG. 11A, a plurality of articles 200 packaged in cardboard boxes are piled up, and image data is acquired that indicates images with two-dimensional codes 100 on the front faces of the cardboard boxes. In the image example in FIG. 11A, the articles are partitioned every eight boxes with partition plates. In total, articles of 8 boxes×12=96 boxes are piled up. Among those, the target region of the detection of the designated article is constituted with 48 boxes (included in the image) having two-dimensional codes on the front side.

At step S508, processing for highlighting the image region of the two-dimensional code of the designated article is performed on the data of the original image acquired at step S506. The processing then proceeds to step S510.

Here, the "processing for highlighting" is the following processing, for example: enclosing the periphery of the image region of the two-dimensional code in the original image with a line of a noticeable color such as red; filling the image region of the two-dimensional code with a noticeable color; or highlighting the outline portion of the image region of the two-dimensional code (for example, thickening the outline, changing the color of the outline to a noticeable color such as red, or the both). The processing may additionally provide flashing display or animation display.

In other words, the "processing for highlighting" means processing of performing highlighting processing such as marking so that the image of the two-dimensional code corresponding to the designated article as a detection target in the original image becomes visually distinguishable.

At step S510, it is determined whether there exist a plurality of two-dimensional codes corresponding to the designated article. If it is determined that there exist a plurality of two-dimensional codes (Yes), the processing proceeds to step S512. If not (No), the processing proceeds to step S514.

When the processing proceeds to step S512, based on the information of the storage start date, the original image is subjected to processing of adding number images in order of start of storage in the vicinity of the respective two-dimensional codes corresponding to the designated articles. The processing then proceeds to step S514.

At step S514, the original image is subjected to processing of adding image information such as the storage start date, shipment deadline, and use-by date of the designated article. The processing then proceeds to step S516.

The processing is performed so that these pieces of information on the article are displayed in a portion in the image where the article 200 is not displayed. If the display region cannot be reserved, processing of generating a display region for these pieces of information may be performed.

When there exist a plurality of two-dimensional codes corresponding to the designated articles, the information on the articles is displayed in association with each number.

The processing of displaying information for the article 200 at step S514 may not be performed or may be set not to be performed. If the processing is not performed, the processing proceeds from step S512 to step S516.

In this case, at step S516, processing of displaying the image processed at steps S508, S512, and S514 on the display device 72 is performed. A series of processing as described above then ends, and the processing returns to the original processing.

Here, the image example in FIG. 11B is an example in a case where three designated articles are detected from the original image in FIG. 11A. In this image example, the two-dimensional code corresponding to each article is marked with a rectangular frame. This enables the user to instantly visually grasp which of the articles 200 in the original image the designated article is.

As shown in FIG. 11B, numbers (1) to (3) are given (displayed) in the vicinity of (to the lower right) of the two-dimensional codes of the designated articles, in chronological order of the date of warehousing. This enables the user to instantly visually recognize, from the number images, the order in which the articles are warehoused. Consequently, the user can easily perform shipment operation in chronological order of the date of warehousing. In particular when the articles have the use-by date, the articles can be shipped in the order in which they reach the use-by date.

As shown in FIG. 11B, on the upper right of the screen, character images of item codes, dates of warehousing, shipment deadlines, and use-by dates are displayed together with the numbers corresponding to the order of warehousing. This enables the user to easily determine whether the detected article is certainly the designated article, and to easily know the correct date of warehousing, shipment deadline, and use-by date. In the example shown in FIG. 11B, the articles are chemicals, and the shipment deadline, use-by date, etc., of each article can be checked.

When it is determined at step S502 that the designated article does not exist and the processing proceeds to step S518, the image data of the original image is acquired from the RAM 62 or the storage device 70, and the original image is displayed on the display device 72 on the basis of the acquired image data. A series of processing then ends, and the processing returns to the original processing.

Specifically, when the designated article is not included in the shot image, the original image not subjected to the highlighting processing or the addition processing is displayed. This enables the user to instantly visually recognize that the designated article does not exist. A message indicating that there are no designated articles may be displayed in the original image.

When the detection mode being set is not the article detection mode at step S500 and the processing proceeds to step S520, it is determined whether the detection mode being set is the expiration-date management mode.

If it is determined that the detection mode being set is the expiration-date management mode (Yes), the processing proceeds to step S522. If it is determined that it is not the expiration-date management mode (No), the processing proceeds to step S532.

When the processing proceeds to step S522, information of the shipment deadline and use-by date corresponding to the identification information obtained through the identification at step S134 in FIG. 3 is acquired from the database stored in the storage device 70. The processing then proceeds to step S524.

At step S524, the acquired shipment deadline and use-by date is compared with information of year/month/day/time at present (at the present time) acquired from a not-shown real time clock (RTC) included in the computer system, to determine whether there exists an article past the deadline.

If it is determined at step S524 that there exists an article (hereinafter referred to as the expired article) that is past the deadline (Yes), the processing proceeds to step S526. If it is determined there are no expired articles (No), the processing proceeds to step S530.

Here, at step S524, it is possible to detect not an article past the deadline but an article having particular days or less left until the deadline. Specifically, at step S524, the determination may be made by comparing the deadline obtained by subtracting a particular period from the acquired shipment deadline and use-by date with the information of year/month/day/time at the present time.

When the processing proceeds to step S526, the image data of the original image and the coordinate information of the two-dimensional code region corresponding to the expired article are acquired from the RAM 62 or the storage device 70. The processing then proceeds to step S528.

Here, it is assumed that, for example, image data of a shot image of a subject as shown in FIG. 12A is acquired, in which a plurality of articles 300 are placed on display shelves and the two-dimensional code 100 is provided on the front side of each article 300. In the example in FIG. 12, the two-dimensional code reader 1 is configured as a portable information terminal as shown in FIG. 12B. A lens unit of the camera 76 is disposed on the upper portion of the back side of the information terminal as shown in FIG. 12C. This enables the user to shoot an image of the display shelves with the camera 76 on the back side while viewing the display screen shown in FIG. 12B. The data of the original image is data of the shot image in a shot range PR as shown in FIG. 12B. In other words, in the embodiment illustrated here, the user carrying the two-dimensional code reader 1 can check the detection result of the expired article while shooting an image of the products on the display shelves.

At step S528, the data of the original image acquired at step S526 is subjected to processing of highlighting the image region of the two-dimensional code of the expired article. The processing then proceeds to step S516.

The processing here is similar to the processing at step S508 above.

In this case, at step S516, processing of displaying the image processed at step S528 on the display device 72 is performed. A series of the article detection processing as described above then ends, and the processing returns to the original processing.

The image example in FIG. 12B is an example in which three expired articles are detected. In this image example, the two-dimensional code corresponding to each expired article is marked with a round frame. This enables the user to instantly visually grasp which of the articles 300 in the original image the expired article is.

When it is determined at step S524 that there exist no expired article and the processing proceeds to step S530, the image data of the original image is acquired from the RAM 62 or the storage device 70, and the original image is displayed on the display device 72 on the basis of the acquired image data. A series of processing then ends, and the processing returns to the original processing.

In short, when no expired article is included in the shot image, the original image not subjected to the highlighting processing or the addition processing is displayed. This enables the user to instantly visually recognize that there are no expired articles. An image such as a message indicating that there are no expired articles may be displayed in the original image.

When it is determined at step S520 that the mode is not the expiration-date management mode and the processing proceeds to step S532, processing of displaying a message prompting to set a mode on the display device 72 is performed. A series of processing as described above then ends, and the processing returns to the original processing.

This processing is not required when one of the article detection mode and the expiration-date management mode is configured to be always set.

(3-6) Detection-Mode Setting Processing

A processing procedure of the detection-mode setting processing will now be described with reference to FIG. 13. This processing is for designating an article as a detection target, and is performed, for example, before the code-using article detection processing in FIG. 3.

Figure 13:
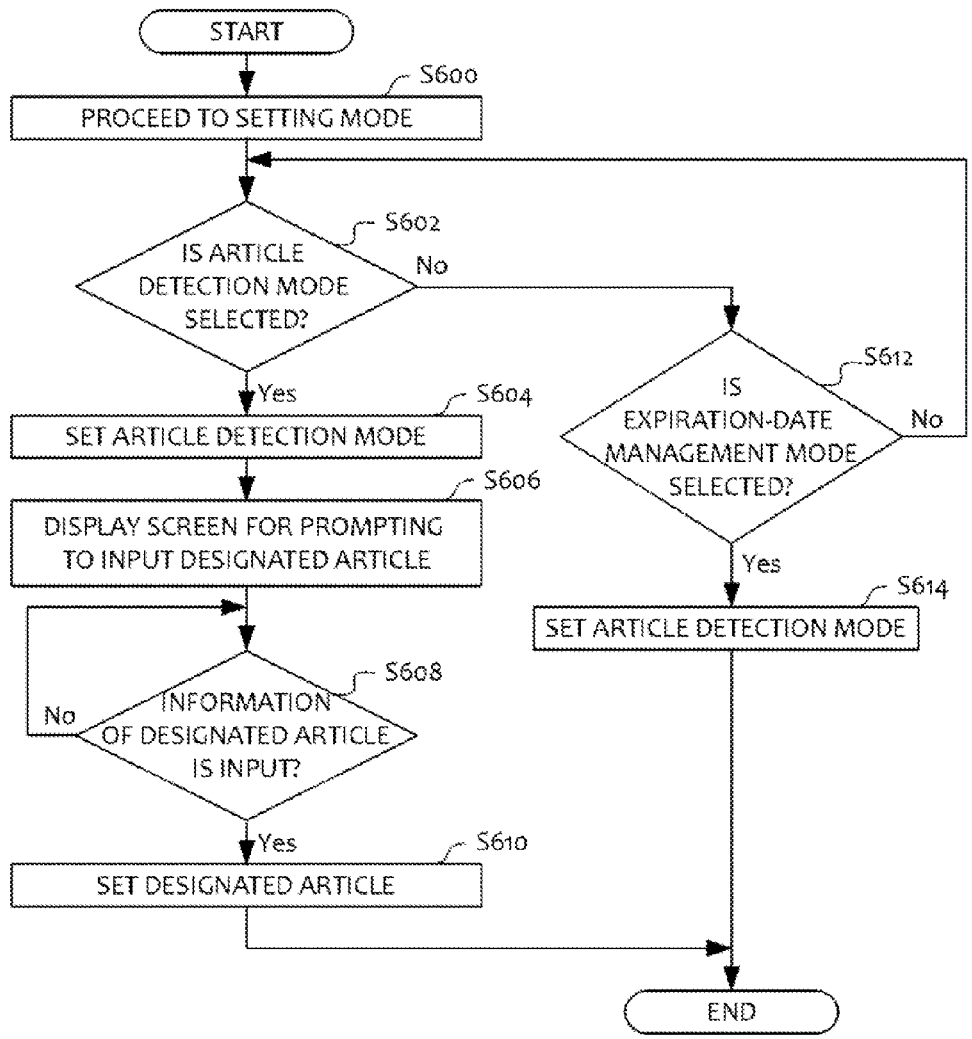
FIG. 13 is a flowchart showing an example of a processing procedure of detection-mode setting processing.

Here, FIG. 13 is a flowchart showing an example of the processing procedure of the detection-mode setting processing.

The detection-mode setting processing is performed independently of the code-using article detection processing in FIG. 3 described above. The detection-mode setting processing is activated in response to an instruction input by the user through the input device 74. As shown in FIG. 13, first, the processing proceeds to step S600.

At step S600, the processing proceeds to the setting mode of setting a detection mode, in response to the instruction input. The processing then proceeds to step S602.

Here, graphics of a button for selecting the article detection mode and a button for selecting the expiration-date management mode are displayed on the display screen of the display device 72, so that the detection mode can be easily selected through the input device 74.

Any of the modes can be selected as follows: if the display device 74 is a touch panel, the button displayed on the screen is selected and pressed by touching the touch panel with a finger; and if the input device is a mouse, the button is selected and pressed by clicking the button with the mouse cursor. In other words, the detection mode can be easily selected and set using a graphical user interface (GUI).

At step S602, it is determined whether the article detection mode is selected. If it is determined that it is selected (Yes), the processing proceeds to step S604. If not (No), the processing proceeds to step S612.

When the processing proceeds to step S604, the article detection mode is set as a detection mode. The processing then proceeds to step S606.

At step S606, a screen prompting an input of a designated article is displayed on the display screen of the display device 72. The processing then proceeds to step S608.

For example, a list of articles that can be designated as a designated article is displayed to allow the user to make a selection therefrom. The articles that can be designated may be searched using an item name, an item code, a serial number, etc.

At step S608, it is determined whether information of a designated article is input. If it is determined that the input is made (Yes), the processing proceeds to step S610. If not (No), the determination processing continues until an input is made.

When the setting mode is terminated, for example, in a case where the designated article is not found, the processing exits from the determination processing, and a series of processing ends.

At step S610, the designated article as a detection target input at step S608 is set. The processing then ends.

The article detection mode is thus set as a detection mode, and the designated article is set. Specifically, the information thereof is stored at a particular address in the RAM 62.

When the article detection mode is not selected at step S602 and the processing proceeds to step S612, it is determined whether the expiration-date management mode is set. If it is determined that the expiration-date management mode is set (Yes), the processing proceeds to step S614. If not (No), the processing proceeds to step S602, and the determination processing continues.

When the processing proceeds to step S614, the expiration-date management mode is set as a detection mode. A series of processing then ends.

The expiration-date management mode is thus set as a detection mode. This information is stored at a particular address in the RAM 62 in a similar manner as in the article detection mode.

(4) Operation and Effect

The two-dimensional code reader 1 in the foregoing embodiment can generate an edge image (S108 in FIG. 3) from the acquired image (original image) through generating a gray scale image (S202, S210 in FIG. 5B), generating a binarized image (S204, S212 in FIG. 5B), and linearizing an outline portion of an object in the binarized image (S206 in FIG. 5B).

In addition, a two-dimensional code region can be detected from the original image (S130 in FIG. 3) on the basis of the generated edge image, through extraction of a candidate region in the edge image (S110 in FIG. 3) and determination as to whether a characteristic pattern is included in each corresponding region in the original image that corresponds to the extracted candidate region (S128 in FIG. 3)

As described above, a candidate region can be extracted from an edge image in which the outline portion of an object in the binarized image is linearized. The candidate region can be therefore extracted faster than when linearization is not performed.

Among the corresponding regions in the region of the original image that correspond to the candidate regions, a corresponding region including a characteristic pattern is detected as a two-dimensional code region. This enables the specification of each of a plurality of two-dimensional codes included in the original image.

In the foregoing embodiment, extraction of a candidate region, determination as to whether a characteristic pattern is included in the extracted candidate region, and detection of a two-dimensional code region are repeatedly carried out for different kinds of edge images generated based on the original image (S108 to S144 in FIG. 3).

Consequently, it can be expected that even when a two-dimensional code region cannot be detected based on a particular edge image, a two-dimensional code region is detected based on another edge image. This leads to the improvement of accuracy in detecting a two-dimensional code in the original image.

During the course of this repetition, it is conceivable that the candidate region newly extracted for a particular edge image agrees, in the region of the original image, with the already-extracted candidate region extracted for the edge image previously referred to. With the configuration above, determination as to whether a characteristic pattern is included in the extracted candidate region and detection of a two-dimensional code region are not carried out for this already-extracted region (the branch to "Yes" at S124 in FIG. 3).

This can eliminate an unnecessary processing load, such as repeatedly identifying two-dimensional codes that should originally be identical, during the identification of information coded with a two-dimensional code in a region detected based on a plurality of edge images.

During the course of this repetition, it is determined whether the shape information such as the aspect ratio and the angle of four corners of each candidate region falls within a preset error range with respect to an ideal region shape (S300 to S308 in FIG. 6), whereby it can be determined whether the extracted candidate region is a valid candidate region (S122 in FIG. 3).

This enables the exclusion of a candidate region having a shape outside the error range with respect to the ideal shape from the subsequent processing target, thereby preventing unnecessary processing on a region evidently different from a two-dimensional code region.

In the foregoing embodiment, an edge image is generated from the original image, and a candidate region serving as a candidate for a two-dimensional code region is extracted from the edge image (S110 in FIG. 3). Thereafter, a two-dimensional code region is detected from a region in the original image that corresponds to the extracted candidate region to identify information (S116 to S134 in FIG. 3). A two-dimensional code region can therefore be detected from the extracted candidate region, that is, a more limited range when compared with a case where a two-dimensional code region is to be detected without extracting a candidate region. This can reduce the processing load and processing time required to identify information from a two-dimensional code region.

In the foregoing embodiment, information can be identified that is coded with a two-dimensional code in a region detected based on a plurality of edge images, (S134 in FIG. 3).

In the foregoing embodiment, it can be determined that the candidate region extracted from a particular edge image and the already-extracted candidate region in another edge image agree on the basis that the degree of overlap between the two is equal to or greater than a certain level, depending on the degree of overlap.

In the foregoing embodiment, it can be determined that the candidate region extracted from a particular edge image and the already-extracted candidate region in another edge image agree on the basis that one of those candidate regions is embraced in the other candidate region.

In the foregoing embodiment, on the basis that one or more vertices of the candidate region extracted from a particular edge image are located within a certain range from any of vertices of the already-extracted candidate region, it can also be determined that those candidate regions agree.

In the foregoing embodiment, a candidate region can be extracted in accordance with a rule defined in the template. Changing the template as well as the rule enables the detection of a two-dimensional code region formed in conformity with an arbitrary rule.

In the foregoing embodiment, information indicated by a two-dimensional code can be identified based on the color given to each cell C of the two-dimensional code (S132 to S134 in FIG. 3).

In the foregoing embodiment, even when a region corresponding to part of the cells C in a two-dimensional code is impaired due to the state of generating (specifically, shooting) an image, the color that should originally be given to such a cell is estimated based on the coloring rule (S452 in FIG. 8), thereby allowing information to be identified based on the estimated color. This can prevent a failure in the identification itself of information.

In the foregoing embodiment, a color given to each cell C in a two-dimensional code can be determined based on which determination region in the color space the color is included in (S410 in FIG. 8).

In this configuration, in the color determination for each pixel, color determination processing is performed by successively scanning a two-dimensional code region through raster scan (S410 in FIG. 8). When it is determined that a certain number of pixels or more located in each row in a region of each cell C are included in a determination region (the branch to "Yes" in S408 in FIG. 8), the color determination processing can be omitted for the remaining pixels in that row in the region of the appropriate cell C.

This enables the color determination processing for each pixel to be performed faster than when the color determination processing is performed for all the pixels in each row in a region of each cell C.

Additionally, this configuration can prevent a failure in the identification itself of information in the determination of the color of each cell C even when the color given to many cells C is not included in any determination region.

Specifically, when there exist a certain number of cells or more that are determined not to be included in any of the determination regions corresponding to a plurality of colors (the branch to "Yes" in S440 in FIG. 8), the color given to each cell is determined again after expanding the determination regions by a certain region or shifting the determination regions (S444 to S438 in FIG. 8).

This configuration can increase the probability of color determination in the following manner even when the conditions of generating an image are so bad that the color cannot be determined appropriately: the color is determined again with the determination sensitivity improved by expanding the determination regions; or the color is determined again by shifting the determination regions to respective appropriate positions corresponding to the color distribution.

In the foregoing embodiment, when the article detection mode is set, it can be determined, based on information identified based on the result of color determination of each cell C, whether a designated article exists among articles corresponding to that information (S502 in FIG. 9).

When a designated article exists, the original image can be processed such that a two-dimensional code region corresponding to the designated article in the original image is highlighted (S508 in FIG. 9). In addition, the image thus processed can be displayed (S516 in FIG. 9).

This enables the displaying of an image in which a two-dimensional code region corresponding to a designated article in the original image is highlighted. Thus, by viewing the displayed image, the user can easily and instantly grasp the location of the designated article in the original image.

In this configuration, when a plurality of designated articles exist, processing is performed to add images of sequential numbers to the original image, in chronological order of management start date, on the two-dimensional code regions corresponding to the designated articles or in the vicinity thereof, based on information of the management start date of each designated article (S512 in FIG. 9).

This enables the user to view the displayed image and visually grasp the order of management start date of the designated articles, simply and instantly. For example, the user can easily perform an operation such as shipping articles in a warehouse in chronological order of management start date.

In this configuration, in addition to the highlighting processing, processing of adding display information related to the designated article can be performed on the original image (S514 in FIG. 9).

This enables the user to view the displayed image and check the information related to the designated article, such as item name, item code, management start date, and shipment deadline.

In this configuration, when the expiration-date management mode is set, the article past the expiration date such as a shipment deadline or a use-by date or the article having a particular period or shorter left until the expiration date can be set as a designated article. It can be determined whether there exists an article past the expiration date or an article having a particular period or shorter left until the expiration date among the articles corresponding to the information identified based on the color determination results of cells C (S524 in FIG. 9).

When there exists a designated article, the original image can be processed such that the two-dimensional code region corresponding to the designated article in the original image is highlighted (S528 in FIG. 9). In addition, the image thus processed can be displayed (S516 in FIG. 9).

This enables the displaying of an image in which the two-dimensional code region corresponding to the designated article in the original image is highlighted. Thus, by viewing the displayed image, the user can easily and instantly grasp the location of the designated article in the original image.

(5) Modifications

An embodiment of the present invention has been described above. However, the invention is not limited to the foregoing embodiment by any means. The invention is susceptible to various modifications belonging to the technical scope of the invention, as a matter of course.

For example, the two-dimensional code reader 1 in the foregoing embodiment is illustrated to be configured as a single device. However, the two-dimensional code reader 1 may be configured as a system including a plurality of devices operating in cooperation with each other.

In the foregoing embodiment, a two-dimensional code region is not limited to the two-dimensional code as described above, and may be a region indicating a particular image (for example, a logo).

In the foregoing embodiment, candidates of colors that should be given are selected in conformity with the coloring rule, and the most probable single color among those is estimated as the color that should originally be given in conformity with the coloring rule. However, at the stage when the candidates of colors are selected in this manner, the user may select any one of these candidates.

In addition, information may be identified for the colors selected as candidates, and any of the information thus identified may be selected by the user. In this case, the following configuration is possible: no processing is performed at step S452 in FIG. 8, and the candidate colors are determined as colors given to the appropriate cell at S454; at S134 in FIG. 3, if there exist a plurality of colors determined as colors given to the cell C, information may be identified based on each color or each color combination; and any of the information thus identified is selected by the user.

In the foregoing embodiment, an example of searching for a designated article and an example of searching for an article that satisfies the conditions for the expiration date have been illustrated in the article detection processing. However, the configuration is not limited to those examples. An article that satisfies any other conditions may be searched for.

In the foregoing embodiment, number images are displayed, in chronological order of management start date, on the two-dimensional code regions or in the vicinity thereof. However, the configuration is not limited thereto. Sequential number images based on any other conditions, such as the order in which the expiration date comes earlier, may be displayed.

In the foregoing embodiment, the code-using article detection processing has been described as a series of processing triggered by an operation input by the user through the input device 74. However, the configuration is not limited thereto.

Another configuration such as the following is possible: in the state in which the article as a detection target is set (the detection mode is set), the code-using article detection processing may be repeatedly executed even without a trigger; the detection processing is always executed on the shot image; and the image of the detection result is always displayed.

In the foregoing embodiment, the two-dimensional code reader 1 is configured to execute a dedicated program with the CPU 60 to implement each function necessary for the code-using article detection processing. However, the configuration is not limited thereto. For example, each function may be implemented using both hardware and software by partially replacing the processing with hardware such as a semiconductor integrated circuit. If possible, each function may be implemented mainly by hardware by replacing the processing entirely or almost entirely with hardware.

(6) Correspondence to the Invention

In the embodiment described above, S102 in FIG. 3 is an image acquisition unit in the invention, S108 in FIG. 3 (S200 to S212 in FIG. 5) is a component conversion unit in the invention, S110 in FIG. 3 is a region extraction unit in the invention, and S128 in FIG. 3 is a pattern determination unit in the invention.

S130 in FIG. 3 is a region detection unit in the invention, S108 to S144 in FIG. 3 (in particular, S108, S142, S144) are a repetitive execution unit in the invention, S124 in FIG. 3 is an agreement determination unit in the invention, and S134 in FIG. 3 is an information identifying unit in the invention.

S400 in FIG. 8 is a separator-region specifying unit in the invention, S402 in FIG. 8 is a cell-region specifying unit in the invention, S452 in FIG. 8 is a color estimation unit in the invention, and S410, S438, and S454 in FIG. 8 are a color determination unit in the invention.

S502 and S 524 in FIG. 9 are an article presence/absence determination unit in the invention, S508, S512, and S514 in FIG. 9 are an image processing unit in the invention, and S506 in FIG. 9 is an image display unit in the invention.

The detection mode is specifying information in the invention, and S600 to S614 in FIG. 13 are a specifying-information setting unit in the invention.

EXPLANATIONS OF LETTERS OR NUMERALS

1 . . . TWO-DIMENSIONAL CODE READER, 60 . . . CPU, 62 . . . RAM, 64 . . . ROM, 66 . . . I/F, 68 . . . BUS, 70 . . . STORAGE DEVICE, 72 . . . DISPLAY DEVICE, 74 . . . INPUT DEVICE, 76 . . . CAMERA, 78 . . . NIC, C . . . CELL

The invention claimed is:

1. A two-dimensional code reader comprising:
an image acquisition unit acquiring an image formed by shooting a region including a plurality of two-dimensional code regions that are configured to include a plurality of cells arranged, the cells each being colored such that the cells include cells of a plurality of kinds in different colors to code one or more pieces of information in accordance with colors given to the cells or a combination of colors, and the cells are divided by a separator given a predetermined color;
a component conversion unit converting the image acquired by the image acquisition unit into an edge image indicating the distribution of edge components included in the image;
a region extraction unit extracting a region formed in conformity with a predetermined rule that is a rule for determining whether a region should be a candidate region of the two-dimensional code based on a parameter of an outer shape of the two-dimensional code, from the edge image converted by the component conversion unit, as a candidate region containing the corresponding two-dimensional code region;
a pattern determination unit determining, for a corresponding region that corresponds to the candidate region that is extracted by the region extraction unit in the image acquired by the image acquisition unit, whether a characteristic pattern that is a pattern for determining whether a pattern formed in the corresponding region is the two-dimensional code region is included in elements forming the corresponding region;
a region detection unit being capable of detecting each of the two-dimensional code regions included in the image by detecting, as the two-dimensional code region, the corresponding region that is determined by the pattern determination unit to include the characteristic pattern;

a color determination unit determining a color given to a region of each cell in each of the two-dimensional code regions detected by the region detection unit;

an information identifying unit identifying the coded information on the basis of a color given to the region of each cell or a combination of colors, based on the assumption that the region of each cell in the two-dimensional code region is given the color determined for the region of the cell by the color determination unit;

a separator-region specifying unit specifying the location of a region of the separator in the two-dimensional code region by performing color determination processing on respective pixels in the two-dimensional code region on the basis of the predetermined color; and a cell-region specifying unit specifying the location of a region of each cell of the two-dimensional code region on the basis of the location of the region of the separator specified by the separator-region specifying unit, and the color determination unit successively determining a color of a region of each cell in the two-dimensional code region, pixel by pixel by determining whether a color corresponds to any one of a plurality of colors used in the two-dimensional code, omitting color determination processing for remaining pixels not yet subjected to color determination processing when a particular number of determination results with a valid color, the valid color is a color corresponds to any one of the plurality of colors, has been obtained, and then determining a color given to the region of each cell on the basis of the particular number of determination results with a valid color.

2. The two-dimensional code reader according to claim 1, wherein the color determination unit successively determines respective colors of pixels, pixel group by pixel group that forms a row or a column in the two-dimensional code region; when a particular number of determination results with a valid color has been obtained in a part corresponding to a region of each cell of each row or each column, the color determination unit omits color determination processing for remaining pixels not yet subjected to color determination processing in that row or column up to a pixel immediately before a pixel indicating a region of a next cell, and then determines a color given to the region of each cell on the basis of the determination result with the color for each row or each column for the region of each cell.

3. The two-dimensional code reader according to claim 1, wherein the color determination unit successively determines respective colors of pixels, pixel group by pixel group that forms a row or a column, in a region of each cell in the two-dimensional code region; when a particular number of determination results with a valid color has been obtained in each row or each column corresponding to a region of each cell, the color determination unit omits color determination processing for remaining pixels not yet subjected to color determination processing in that row or column up to a pixel immediately before a pixel indicating a region of a next cell, and then determines a color given to a region of each cell on the basis of the determination result with the color of each row or each column.

4. The two-dimensional code reader according to claim 1, further comprising:

a repetitive execution unit successively allowing conversion of the image into an edge image by the component conversion unit with two or more different kinds of conversion conditions, and repeatedly allowing, for each of the edge images converted with the conversion conditions, extraction of the candidate region by the region extraction unit, determination of the characteristic pattern by the pattern determination unit, and detection of the two-dimensional code regions by the region detection unit; and an agreement determination unit determining whether a candidate region extracted by the region extraction unit for a particular edge image agrees with a candidate region extracted by the region extraction unit (hereinafter referred to as "the already-extracted candidate region") for another edge image, on the basis of both of the candidate regions, wherein the repetitive execution unit allows determination by the pattern determination unit as to whether the characteristic pattern is included and detection of the two-dimensional code regions by the region detection unit, only for a candidate region determined by the agreement determination unit not to agree with the already-extracted candidate region, among the candidate regions extracted by the region extraction unit.

5. The two-dimensional code reader according to claim 4, wherein the agreement determination unit determines whether each of the candidate regions extracted by the region extraction unit for a particular edge image agrees with the already-extracted candidate region in another edge image, depending on the degree of overlap between both candidate regions.

6. The two-dimensional code reader according to claim 4, wherein the agreement determination unit determines whether each of the candidate regions extracted by the region extraction unit for a particular edge image agrees with the already-extracted candidate region in another edge image, depending on whether one of the candidate regions is embraced in the other candidate region.

7. The two-dimensional code reader according to claim 4, wherein, in a case where the two-dimensional code regions are polygonal, the agreement determination unit determines whether each of the candidate regions extracted by the region extraction unit in a particular edge image agrees with the already-extracted candidate region in another edge image, on the basis of whether one or more vertices of a polygon formed as the candidate region are located within a certain range from any one of the vertices of a polygon formed as the already-extracted candidate region.

8. The two-dimensional code reader according to claim 1, wherein respective colors given to the cells in the two-dimensional code are defined in conformity with a coloring rule according to information to be coded with the cells and colors given to cells adjacent to the cells, among different kinds of colors, the two-dimensional code reader further comprising:

a color estimation unit estimating, in conformity with the coloring rule, a color that should originally be given to a region of a cell that is given a color other than a color to be given in conformity with the coloring rule to the region of the cell or other than a color to be used in the two-dimensional code, among the regions of the cells in the respective two-dimensional code regions detected by the region detection unit, wherein the information identifying unit identifies information on the basis of colors given to regions of the cells or a combination of colors, based on the assumption that the estimated color is given to the region of the cell whose color is estimated by the color estimation unit, among the regions of the cells in the two-dimensional code region.

9. The two-dimensional code reader according to claim 1, wherein the color determination unit determines a color given to a region of each cell in the two-dimensional code region, on the basis of which determination region the color is included in, in a color space expanding around each of a plurality of colors used in the two-dimensional code.

10. The two-dimensional code reader according to claim 9, wherein for a two-dimensional code region that contains a certain number or more of regions of cells determined not to be included in any of the determination regions corresponding to a plurality of colors, the color determination unit expands the determination regions by a certain region and thereafter determines a color given to the region of each cell again.

11. The two-dimensional code reader according to claim 9, wherein for a two-dimensional code region that contains a certain number or more of regions of cells determined not to be included in any of the determination regions corresponding to a plurality of colors, the color determination unit shifts the determination regions in the color space in accordance with the color distribution in the two-dimensional code region and thereafter determines a color given to the region of each cell again.

12. The two-dimensional code reader according to claim 1, wherein, based on a template that defines a rule for forming each of the two-dimensional code regions, the region extraction unit extracts, as positional information of the corresponding candidate region, location information of a region formed in conformity with the rule defined by the template from the edge image converted by the component conversion unit.

13. A non-transitory computer readable medium storing a program causing a computer system to execute a variety of processing procedures functioning as the components as claimed in claim 1.

* * * * *